(12) United States Patent
Nishimura

(10) Patent No.: US 11,287,664 B2
(45) Date of Patent: Mar. 29, 2022

(54) OPTICAL MUX AND DEMUX MODULE

(71) Applicant: Mitsubishi Electric Corporation, Tokyo (JP)

(72) Inventor: Yasunori Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 16/757,705

(22) PCT Filed: Jan. 22, 2018

(86) PCT No.: PCT/JP2018/001776
§ 371 (c)(1),
(2) Date: Apr. 20, 2020

(87) PCT Pub. No.: WO2019/142358
PCT Pub. Date: Jul. 25, 2019

(65) Prior Publication Data
US 2021/0191137 A1   Jun. 24, 2021

(51) Int. Cl.
*G02B 27/14* (2006.01)
*H04B 10/25* (2013.01)
*H04J 14/02* (2006.01)

(52) U.S. Cl.
CPC .............. *G02B 27/14* (2013.01); *H04B 10/25* (2013.01); *H04J 14/02* (2013.01)

(58) Field of Classification Search
CPC .......... G02B 27/14; H04B 10/25; H04J 14/02
USPC ....................................................... 359/634
See application file for complete search history.

(56) References Cited

U.S. PATENT DOCUMENTS

2002/0026981 A1    3/2002  Fukushima
2018/0128983 A1*   5/2018  Huang ............... G02B 6/29365

FOREIGN PATENT DOCUMENTS

JP    2000047027 A    2/2000
WO    2017033230 A1   3/2017

OTHER PUBLICATIONS

International Search Report issued in PCT/JP2018/001776; dated Apr. 10, 2018.

* cited by examiner

*Primary Examiner* — William Choi
(74) *Attorney, Agent, or Firm* — Studebaker & Brackett PC

(57) ABSTRACT

An optical mux and demux module includes: a mirror which has a reflective surface, a parallel block holder which has a first principal surface and a second principal surface arranged in parallel, where the mirror is disposed at a first principal surface side, and a plurality of band pass filters each of which has a fixing side principal surface and an incident side principal surface, where the parallel block holder is fixed on the fixing side principal surface; wherein dug portions, being the same in number with the band pass filters, are formed on the second principal surface which the parallel block holder has, and each of the plurality of band pass filters is fixed with the parallel block holder with an adhesive agent which is thrown into a dug portion.

10 Claims, 21 Drawing Sheets

OPTICAL MUX AND DEMUX MODULE

FIELD OF THE INVENTION

The present application relates to an optical mux and demux module which multiplexes a plurality of different wavelength optical signals, and in particular relates to the internal structure of an optical mux and demux module in which the accuracy in the attaching of an optical component to a main body is stabilized.

BACKGROUND OF THE INVENTION

Wavelength division multiplexing communication (WDM: Wave Division Multiplexing) has become main stream in current optical communications. In the wavelength division multiplexing communication, an optical mux and demux module (an optical multiplexer and an optical demultiplexer) is used, because several wavelengths are employed to perform information communications. The optical mux and demux module functions, at a sending side, as an optical multiplexer which multiplexes a plurality of different wavelength optical signals, and functions, at a receiving side, as an optical demultiplexer which demultiplexes, according to their respective wavelengths, the plurality of different wavelength optical signals which have travelled through a single optical fiber.

In optical components, like an optical mux and demux module, a component to be joined (a mirror, a plurality of band pass filters, and others) is fixed with a joining component (a parallel block holder or a glass block) through a transparent joining member (for example, refer to Patent Document 1 and Patent Document 2). A component to be joined (a mirror, a plurality of band pass filters, and others) is the one on whose main body a metal film or a dielectric multi layered film is formed.

As for the main body of an optical component, a material like glass is preferably employed. As for the material of a dielectric multi layered film, TiO2 and SiO2 are preferably employed. Polishing processing is performed in the main body (the base plate) of a component to be joined, before a metal film or a dielectric multi layered film is formed thereon. After the polishing processing is performed in the main body (the base plate), formation of a metal film or a dielectric multi layered film is carried out in the main body. The joining surface of the component to be joined undergoes a change of form, by the formation of the metal film or the dielectric multi layered film.

CITATION LIST

Patent Literature

Patent Document 1: WO 2017/033230 A1
Patent Document 2: JP 2000-047027 A

SUMMARY OF THE INVENTION

Technical Problem

As mentioned above, with regard to a component to be joined (a mirror, a plurality of band pass filters, and others), polishing processing is performed in the main body, prior to the formation of a metal film or a dielectric multi layered film. The joining surface of a component is made flat by the polishing processing, and those components are fixed together with an adhesive agent. In the case where a dielectric multi layered film which consists of a plurality of layers is vapor deposited on the main body of a component to be joined, a linear expansion difference between the main body and the dielectric multi layered film occurs, and an internal stress occurs in the dielectric multi layered film, at a time later than the vapor deposition. Due to the linear expansion difference and the internal stress, a warp which has a certain curvature radius occurs in the component to be joined.

The joining surface of an optical component on which a metal film or a dielectric multi layered film is formed is not flat. In order to obtain a precise optical mux and demux module, it is required that the mismatch (variation) in the attachment position (angle), which is under the influence of the front end shape of a component to be joined (a mirror, a plurality of band pass filters, and others), is taken into consideration. The technology which is disclosed in the specification of the present application is developed in order to overcome the above mentioned subjects. That is to say, the present application is related to a technology which, when a component to be joined (a mirror, a plurality of band pass filters, and others) is joined on the mounting surface of a joining component, can improved the accuracy in the attachment position (angle) of the above mentioned component to be joined.

Solution to Problem

An optical mux and demux module in accordance with the embodiments of the present invention, includes: a mirror which has a reflective surface, a parallel block holder which has a first principal surface and a second principal surface arranged in parallel, where the mirror is disposed at a first principal surface side, and a plurality of band pass filters each of which has a fixing side principal surface and an incident side principal surface, where the parallel block holder is fixed on the fixing side principal surface, wherein dug portions, being the same in number with the band pass filters, are formed on the second principal surface which the parallel block holder has, and the plurality of band pass filters are fixed with the parallel block holder with an adhesive agent which is thrown into the dug portions.

Advantageous Effects of Invention

The optical mux and demux module in accordance with the embodiments of the present invention, includes: a mirror which has a reflective surface, a parallel block holder which has a first principal surface and a second principal surface arranged in parallel, where the mirror is disposed at a first principal surface side, and a plurality of band pass filters each of which has a fixing side principal surface and an incident side principal surface, where the parallel block holder is fixed on the fixing side principal surface, wherein dug portions, being the same in number with the band pass filters, are formed on the second principal surface which the parallel block holder has, and the band pass filters are fixed with the parallel block holder with an adhesive agent which is thrown into the dug portions. Accordingly, when a component to be joined (each of the plurality of band pass filters and others) is joined on the mounting surface (the second principal surface of the parallel block holder) of a joining component, it becomes possible to improve the accuracy in the attachment position (angle) of the above mentioned component to be joined.

DETAILED DESCRIPTION OF THE INVENTION

Figure 1:
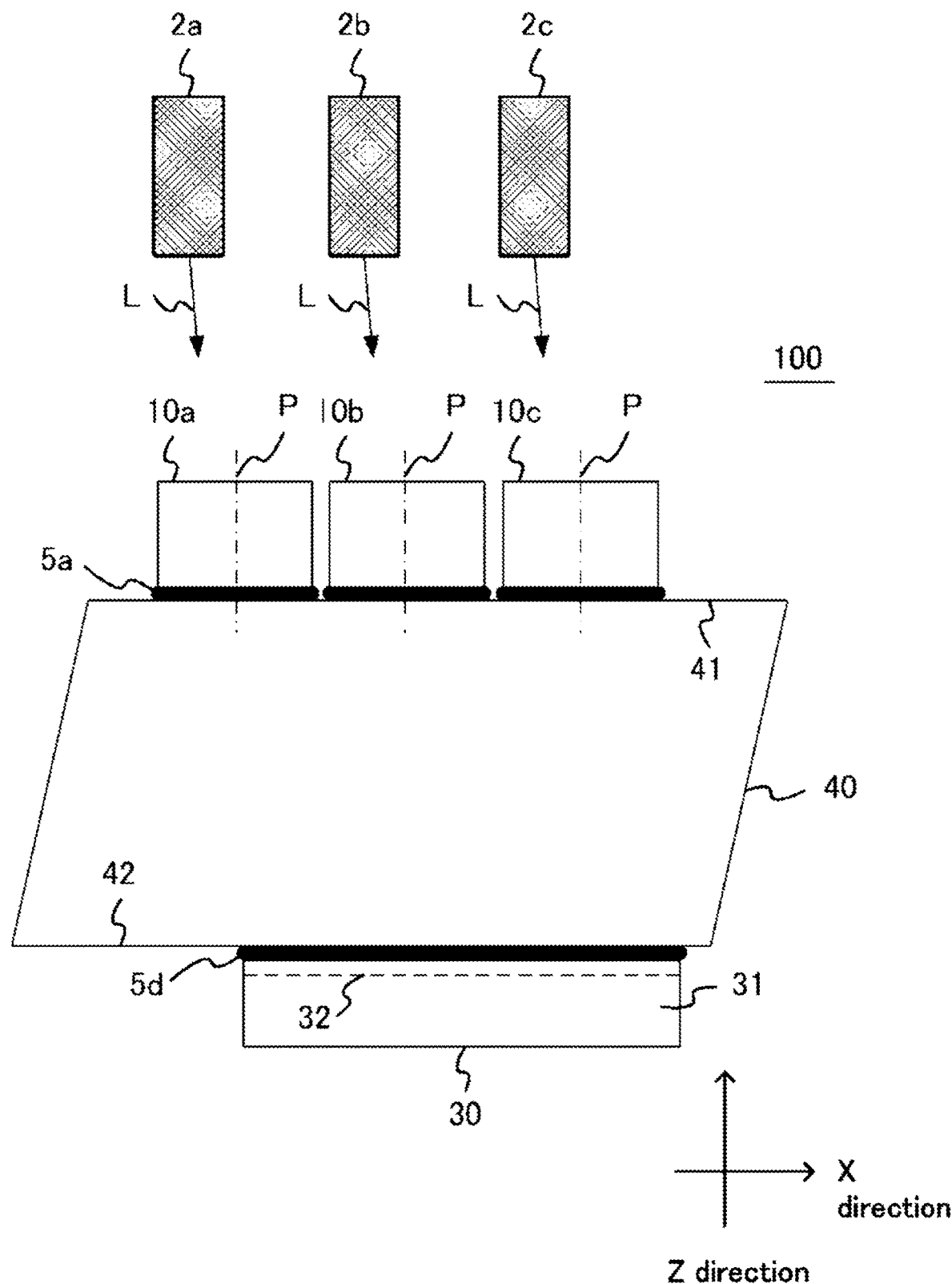
FIG. 1 is a front view for explaining an overall structure, with regard to an optical mux and demux module in accordance with Embodiment 1 of the present invention.

Hereinafter, an optical mux and demux module according to the embodiment of the present invention will be described, with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the optical mux and demux module are further actually provided with a plurality of members, for ease of explanation, only portions necessary for explanation will be described and other portions are omitted.

Embodiment 1

According to the optical communications which have adopted a wave division multiplexing method (WDM: Wave Division Multiplexing), a small number of optical fibers can transmit a massive amount of data at a high speed. In the wave division multiplexing method, an optical mux and demux module is used, and light beams with a plurality of wavelengths are guided to one optical fiber. The optical mux and demux module has a function as an optical multiplexer which works for guiding light beams into a parallel block holder, and a function as an optical demultiplexer which works for the reversed action.

Explanation will be made about the structure of an optical mux and demux module in accordance with the present embodiment of this invention, with reference to drawings. FIG. 1 is a front view which shows the structure of the optical mux and demux module, in accordance with the present embodiment of this invention. The optical mux and demux module 100 is provided with a band pass filter 10a, a band pass filter 10b, a band pass filter 10c, a parallel block holder 40, and a mirror 30. The front shape of the parallel block holder 40 is a parallelogram, according to the embodiments of the present invention. The front shape of the parallel block holder 40 can be other shapes, such as a rectangle.

The optical mux and demux module 100 has a function to multiplex a plurality of optical signals L, which are emitted from the laser light sources 2a to 2c and have each a different center wavelength (λ). One or more optical signals L impinge on each of the band pass filters 10a to 10c. The mirror 30 as well as the band pass filters 10a to 10c is fixed with the parallel block holder 40. The mirror 30 reflects an optical signal L which is propagated through the parallel block holder 40.

Adhesive agents 5a fix the band pass filters 10a to 10c with the parallel block holder 40. The adhesive agent 5d fixes the parallel block holder 40 with the mirror 30. Ultraviolet cure adhesive agent, which becomes hardened when irradiated with ultraviolet rays, or thermosetting adhesive agent, which becomes hardened when heated, is suitably used for the adhesive agents 5a and the adhesive agent 5d. Incidentally, it is obvious that the material of the adhesive agents 5a and the adhesive agent 5d is not limited to the ultraviolet cure adhesive agent or the thermosetting adhesive agent.

The optical signal L which is emitted from the laser light source 2a impinges on the band pass filter 10a. The optical signal L which is emitted from the laser light source 2b impinges on the band pass filter 10b. The optical signal L which is emitted from the laser light source 2c impinges on the band pass filter 10c. Each of the band pass filters 10a to 10c is an optical element which transmits only the light beam with a specific wavelength among incident light beams, and do not transmit other light beams. The band pass filters 10a to 10c correspond one to one with the laser light sources 2a to 2c, and the same number of band pass filters and laser light sources are provided there.

Each of the band pass filters 10a to 10c has an optical axis P. The optical axis P of a band pass filter 10 is shown by a dashed dotted line. The optical axes P of the band pass filters 10a to 10c are arranged in parallel keeping an interval with each other, and at the same time, on the same flat plane. The parallel block holder 40, which corresponds to the main body of the optical mux and demux module 100, is made out of glass or transparent resin, and has a first flat surface 42 (a first principal surface) and a second flat surface 41 (a second principal surface). The mirror 30 is disposed at the first principal surface side of the parallel block holder 40. Each of the band pass filters 10 is disposed at the second principal surface side of the parallel block holder 40.

In the parallel block holder 40, it is required that the first principal surface (the first flat surface 42) and the second principal surface (the second flat surface 41) are in parallel. Dug portions are formed on the first principal surface (the first flat surface 42) and the second principal surface (the second flat surface 41). The mirror 30 is composed of a mirror main body 31 and a reflection film 32 (a reflective surface). Although the mirror main body 31 is made out of glass or metal, the material is not limited to these substances.

The reflection film 32 (the reflective surface) is composed of a metal film or a dielectric multi layered film, which is vapor deposited on either one of the principal surfaces of the mirror main body 31. In the present embodiment, an optical axis P is the axial center of each of the band pass filters 10a to 10c. A direction which is parallel to the optical axes P of the band pass filters 10a to 10c is referred to as Z direction. A direction which intersects perpendicularly with the Z direction and in which the optical axes P of the band pass filters 10a to 10c are lined with each other is referred to as X direction. A direction which intersects perpendicularly with both of the X direction and the Z direction is referred to as Y direction.

Figure 2:
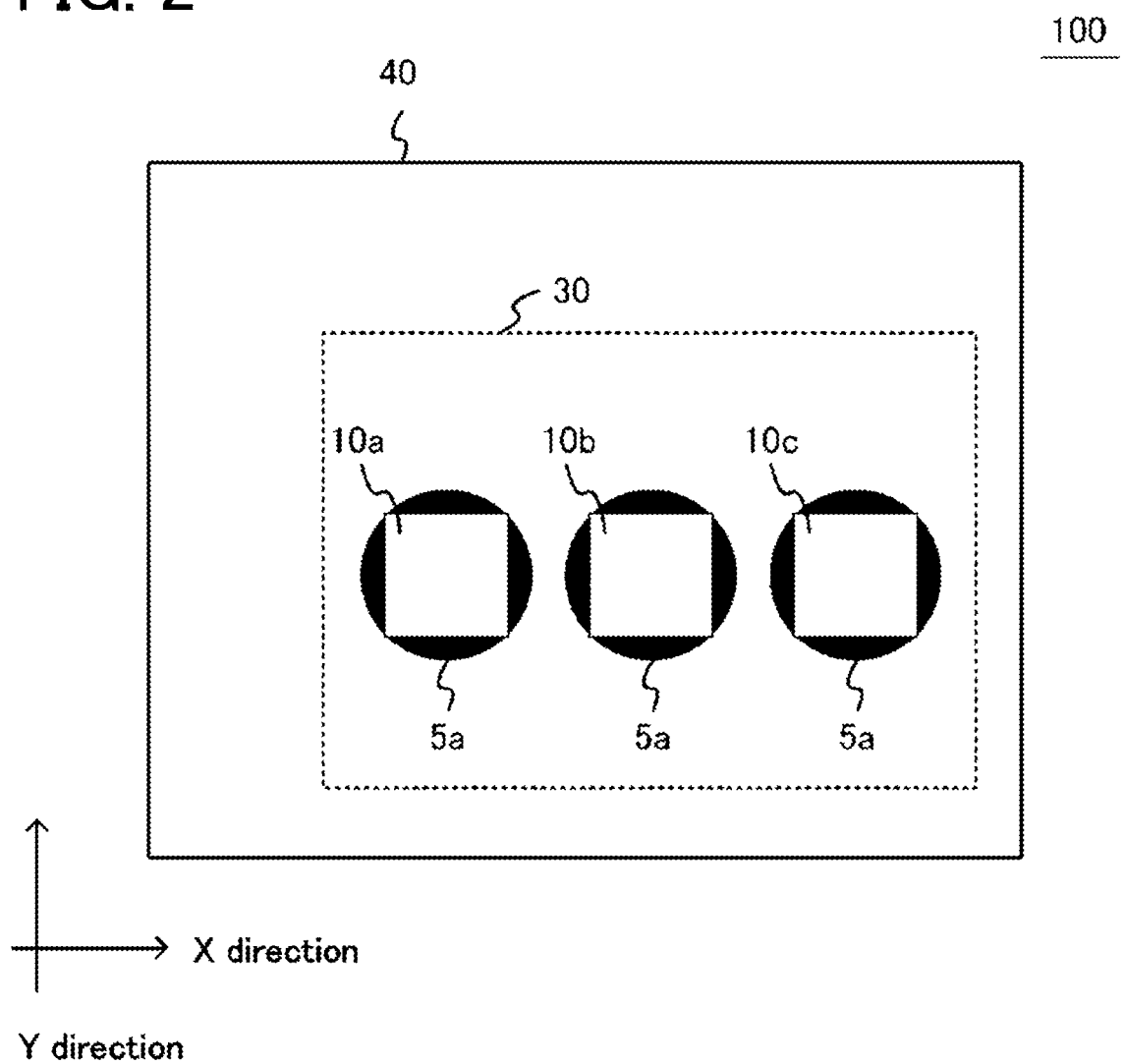
FIG. 2 is a top view for explaining the overall structure, with regard to the optical mux and demux module in accordance with Embodiment 1 of the present invention.

FIG. 2 is a top view which shows the structure of the optical mux and demux module in accordance with the present embodiment of this invention. The parallel block holder 40 is made out of glass or transparent resin. Each of the band pass filters 10a to 10c is fixed on the second principal surface (the second flat surface 41) of the parallel block holder 40, through an adhesive agent 5a. The mirror 30 is fixed on the first principal surface (the first flat surface 42) of the parallel block holder 40 with an adhesive agent 5d. Dug portions are formed on the first principal surface (the first flat surface 42) and the second principal surface (the second flat surface 41) of the parallel block holder 40.

Figure 3:
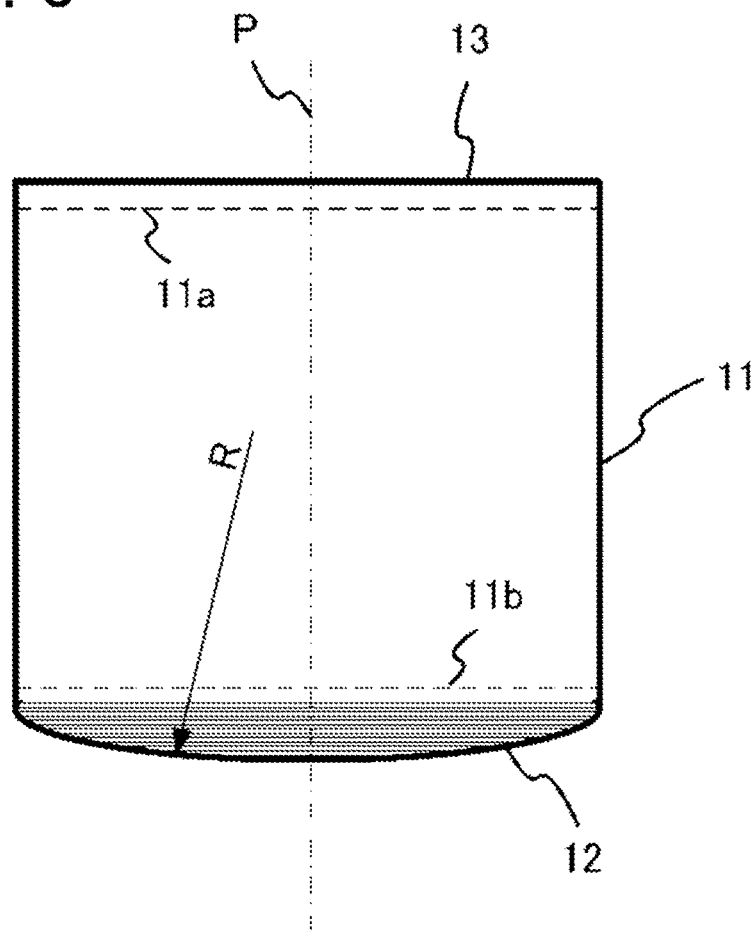
FIG. 3 is a constitution diagram for explaining the structure of a band pass filter in accordance with Embodiment 1 of the present invention.

FIG. 3 is a section drawing which shows the structure of a band pass filter in accordance with the present embodiment of this invention. Each of the band pass filters 10 (the band pass filter 10a, the band pass filter 10b, and the band pass filter 10c) is composed of a base plate 11, a band pass filter film 12, and a antireflection film 13, as shown in the drawing. The base plate 11 (the main body) of a band pass filter is a member of cylindrical shape, which is made out of glass or transparent resin. The band pass filter film 12 functions as a fixing side principal surface of the band pass filter, and has wavelength band transmission characteristics.

The antireflection film 13 functions as an incident side principal surface of the band pass filter, and suppresses the reflection of optical signals L which enter from the laser light sources 2a to 2c. The base plate 11 has a first principal surface 11a and a second principal surface 11b. The first principal surface 11a and the second principal surface 11b intersect at a right angle with the optical axis P of a band pass filter 10. The first principal surface 11a and the second principal surface 11b of the base plate 11 are parallel. The band pass filter film 12 is formed on either one side face of the two, among the first principal surface 11a and the second principal surface 11b. The antireflection film 13 is formed on the other side face of the two.

The optical axis P of a band pass filter 10 passes the center of the base plate 11, when viewed from the front face, and is parallel with the Z direction which heads from the band pass filter 10 to the parallel block holder 40. The band pass filter film 12 and the antireflection film 13 are each composed of a dielectric multi layered film. The refractive index of the base plate 11 is larger than the refractive index of an ambient air. Incidentally, the ambient air is a surrounding gas of the band pass filter 10. When the band pass filter 10 is disposed in a vacuum, nothing exists. In this case, the refractive index of the base plate 11 is larger than the refractive index of the vacuum.

Glass (for example, BK7 or the like) is employed as a construction material of the band pass filter and the mirror. Titanium oxide ($TiO_2$) and silicon dioxide ($SiO_2$) are employed as construction materials of the dielectric multi layered film, in the band pass filter film 12 and the antireflection film 13. The linear expansion of glass (BK7) is $9.4 \times 10^{-6}$/K. The linear expansion of titanium oxide is 7 to $10 \times 10^{-6}$/K. The linear expansion of silicon dioxide is 0.51 to $0.58 \times 10^{-6}$/K. In the optical mux and demux module, an optical component (a band pass filter and a mirror) become a component to be joined.

Before bonding is performed, polishing processing is carried out on the flat surfaces (the first principal surface 11a and the second principal surface 11b) of an optical component. After polishing processing is carried out on the optical component, a dielectric multi layered film which includes a plurality of layers is vapor deposited on the optical component (the band pass filter and the mirror). The optical component and the dielectric multi layered film (the band pass filter film 12 and the antireflection film 13) have linear expansion, and internal stress occurs in the dielectric multi layered film. Due to the linear expansion and the internal stress, a warp which has a curvature radius R occurs at the front end (the mounting surface) of the optical component (the band pass filter).

Figure 4:
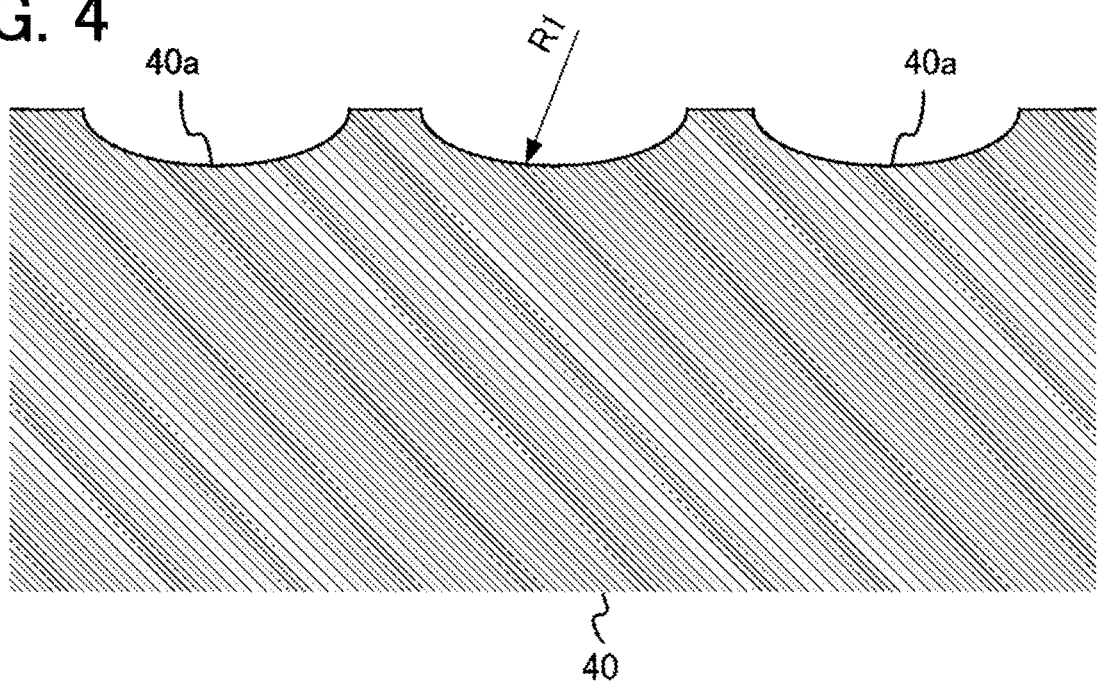
FIG. 4 is a diagram for explaining the structure of a second principal surface of a parallel block holder in accordance with Embodiment 1 of the present invention.

FIG. 4 shows a structure of the parallel block holder 40 in accordance with the present embodiment of this invention. In the parallel block holder 40 (the optical component main body), hollows 40a (dug portions) of concave shape, the number of which is as large as the number of the band pass filters 10, are provided on the Joining surface with the band pass filters 10. The hollow 40a of the parallel block holder 40 has a curvature radius R1. Each of the band pass filters 10a to 10c is fixed to a hollow 40a of the parallel block holder 40, with an adhesive agent.

The joining surface front end of a component to be joined (each of the band pass filters 10a to 10c) has a curvature radius R. The curvature radius R1 of a hollow 40a is larger than the curvature radius R of a component to be joined (each of the band pass filters 10a to 10c). The hollows 40a of the parallel block holder 40 can be formed by a processing method, such as press processing, drill processing, and etching processing.

Figure 5:
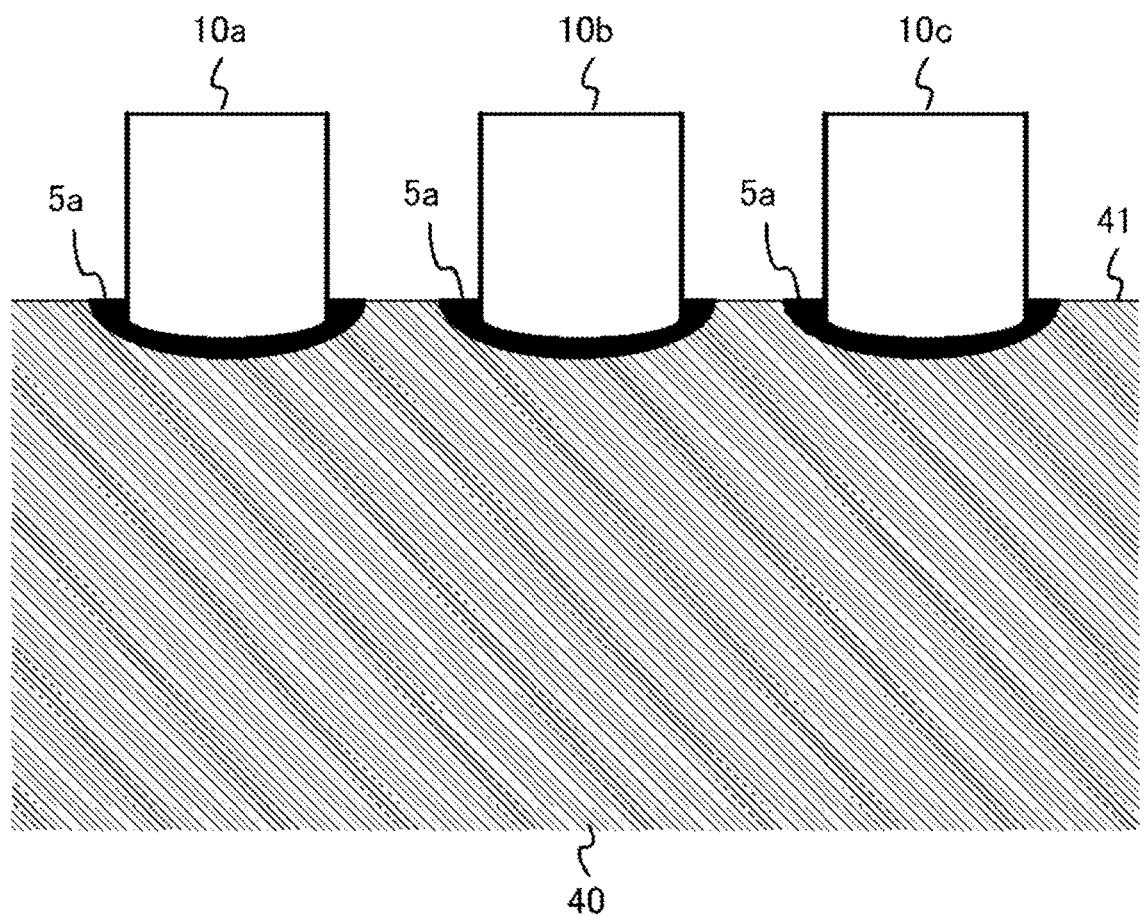
FIG. 5 is a diagram for explaining the bonding structure between a parallel block holder and band pass filters, in accordance with Embodiment 1 of the present invention.

FIG. 5 shows a bonding structure between the band pass filters 10 and the parallel block holder 40, in accordance with the present embodiment of this invention. In the case where an optical component (a band pass filter, a mirror, and others) with a warp is disposed on a flat surface (a first principal surface and a second principal surface) of the parallel block holder 40, the contact state between the parallel block holder 40 and the above mentioned optical component becomes point contact. In the present bonding structure, a hollow 40a of concave shape is provided in the parallel block holder 40. The joining surface front ends of the band pass filters 10a to 10c have each a curvature radius R. The curvature radius R1 of a hollow 40a is larger than each curvature radius R of the band pass filters 10a to 10c.

In the present bonding structure, since the front end of a component to be joined can follow the shape of the above mentioned hollow 40a, a bonded part is in the state of surface contact, which has a larger frictional resistance, compared with point contact. According to the present bonding structure, since an optical component can have a stabilized posture shortly after the optical component is disposed on a flat surface of the parallel block holder 40, the variation in the attachment position (angle) can be suppressed. Further, in the case where the position of the gravity center of an optical component and the center of a hollow are in agreement, the mismatch (variation) in the attachment position (angle) can be suppressed to a minimum.

Figure 6:
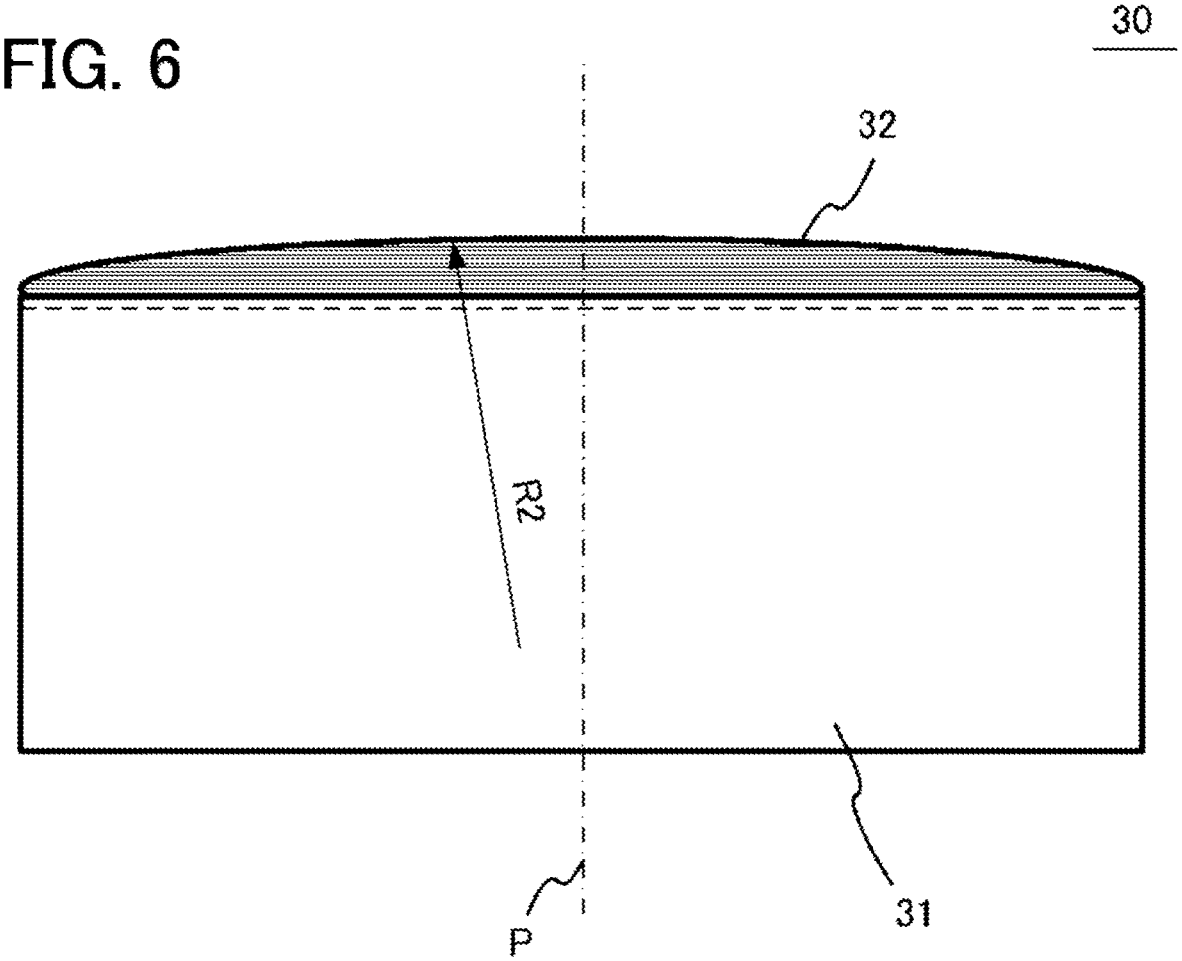
FIG. 6 is a constitution diagram for explaining the structure of a mirror in accordance with Embodiment 1 of the present invention.

FIG. 6 is a section drawing which shows a structure of the mirror in accordance with the present embodiment of this invention. The mirror 30 is composed of a mirror main body 31 and a reflection film 32 (a reflective surface). Although the mirror main body 31 is made of glass or metal, the material is not limited to these substances. The reflection film 32 (the reflective surface) is composed of a metal film or a dielectric multi layered film, which is vapor deposited on either one of the principal surfaces of the mirror main body 31. The mirror 30 has a reflective surface (a reflection film 32).

In the mirror 30, glass (for example, BK7 and the like) is employed suitably as a construction material of the mirror main body 31. A linear expansion of the glass (BK7) is $9.4 \times 10^{-6}$/K. In an optical mux and demux module, optical components (a band pass filter and a mirror) become components to be joined. On the flat surface (the reflective surface) of a mirror, polishing processing is carried out prior to the vapor deposition. On the mirror, dielectric multi layered film which includes a plurality of layers is vapor deposited, after the polishing processing of the mirror main body is carried out. The optical component and the dielectric multi layered film become swelled with linear expansion, and internal stress occurs in the dielectric multi layered film. Due to the linear expansion and the internal stress, a warp which has a curvature radius R2 occurs at the front end (the mounting surface) of the mirror.

Figure 7:
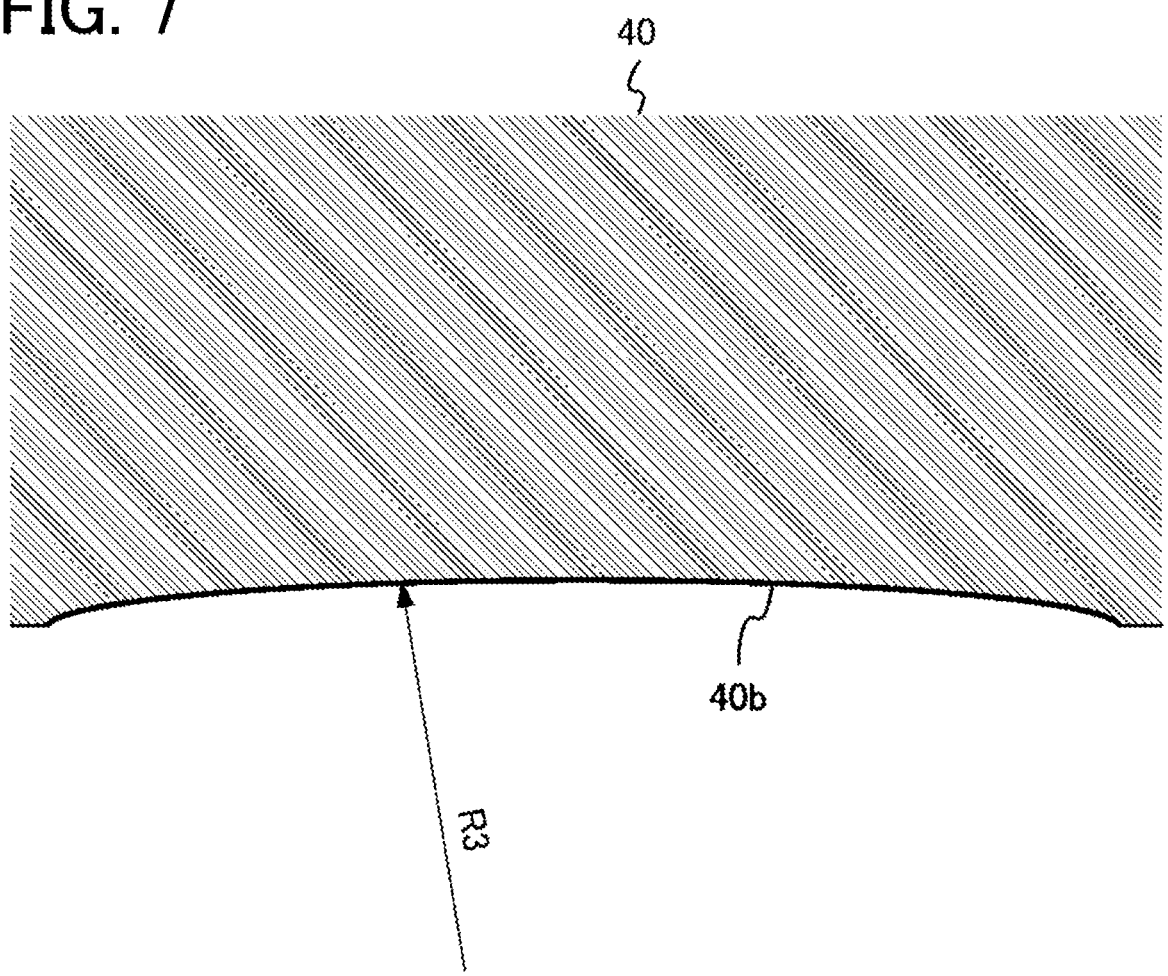
FIG. 7 is a diagram for explaining the structure of a first principal surface of the parallel block holder in accordance with Embodiment 1 of the present invention.

FIG. 7 shows a structure of the parallel block holder 40 in accordance with the present embodiment of this invention. In the parallel block holder 40 (the optical component main body), a hollow 40b (a dug portion) of concave shape is provided on a joining surface with the mirror 30. The hollow 40b of the parallel block holder 40 has a curvature radius R3. The mirror 30 is fixed to the hollow 40b of the parallel block holder 40 with an adhesive agent. The joining surface front end of a mirror 30 (a component to be joined) has a curvature radius R3. The curvature radius R3 of the hollow 40b is larger than the curvature radius R of the component to be joined. The hollows 40b of the parallel block holder 40 can be formed by a processing method, such as press processing, drill processing, and etching processing.

Figure 8:
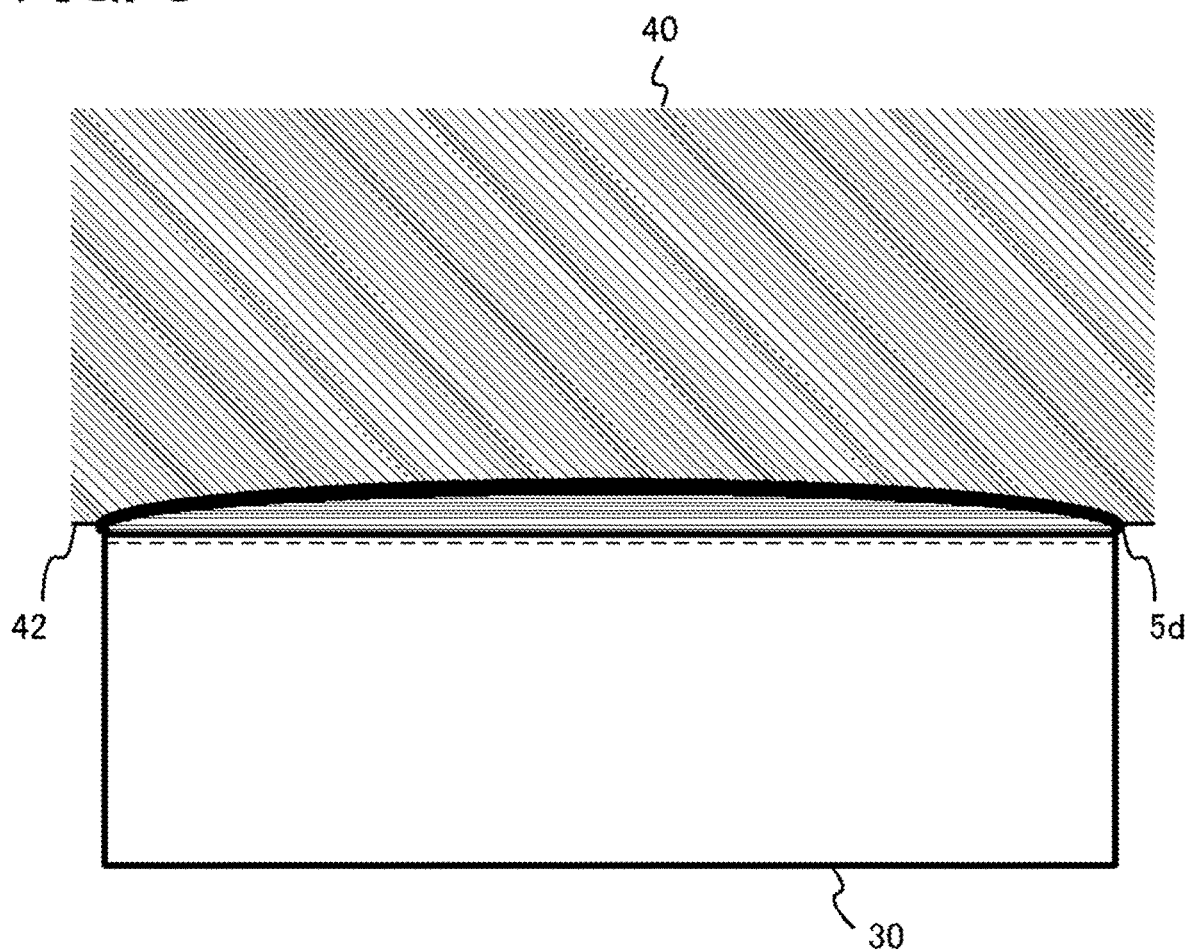
FIG. 8 is a diagram for explaining the bonding structure between the mirror and the parallel block holder in accordance with Embodiment 1 of the present invention.

FIG. 8 shows a bonding structure between the mirror 30 and the parallel block holder 40, in accordance with the present embodiment of this invention. In the case where a mirror with a warp is disposed on a flat surface (a first principal surface) of a parallel block holder 40, the contact state between the parallel block holder 40 and the mirror becomes point contact. In the present bonding structure, a hollow 40b of concave shape is provided in the parallel block holder 40. The joining surface front end of the mirror 30 has a curvature radius R2. The curvature radius R3 of the hollow 40b is larger than the curvature radius R2 of the mirror 30.

In the present bonding structure, since the front end of a component to be joined can follow the shape of the above mentioned hollow 40b, a bonded part is in the state of surface contact, which has a larger frictional resistance, compared with point contact. According to the present bonding structure, since a mirror 30 can have a stabilized posture shortly after the mirror 30 is disposed on a flat surface of the parallel block holder 40, the variation in the attachment position (angle) can be suppressed. Further, in the case where the position of the gravity center of an optical component and the center of a hollow are in agreement, the mismatch (variation) in the attachment position (angle) can be suppressed to a minimum.

The optical mux and demux module in accordance with the present embodiment of this invention is an optical mux and demux module which is provided with a hollow or a groove of concave shape. At a joining surface, which is formed between the main body (the parallel block holder) of an optical mux and demux module and joining material (adhesive agent), where the joining material is for an optical component (a band pass filter, a mirror) which is a component to be joined, there is provided with a hollow of concave shape which has a curvature radius larger than the curvature radius R of the joining surface front end of the component to be joined. According to the above configurations, as mentioned above, surface contact can be attained as the contact state between the main body (the parallel block holder) of an optical mux and demux module and an optical component (a band pass filter, the mirror) which is a component to be joined. The optical mux and demux module becomes less subject to the influence of a position (angle) mismatch, and the accuracy in the attachment position (angle) can be improved.

That is to say, an optical mux and demux module in accordance with the present embodiment of this invention, includes: a mirror which has a reflective surface, a parallel block holder which has a first principal surface and a second principal surface arranged in parallel, where the mirror is disposed at a first principal surface side, and a plurality of band pass filters each of which has a fixing side principal surface and an incident side principal surface, where the parallel block holder is fixed on the fixing side principal surface, wherein dug portions, being the same in number with the band pass filters, are formed on the second principal surface which the parallel block holder has, and the plurality of band pass filters are fixed with the parallel block holder with an adhesive agent which is thrown into the dug portions.

Embodiment 2

Figure 9:
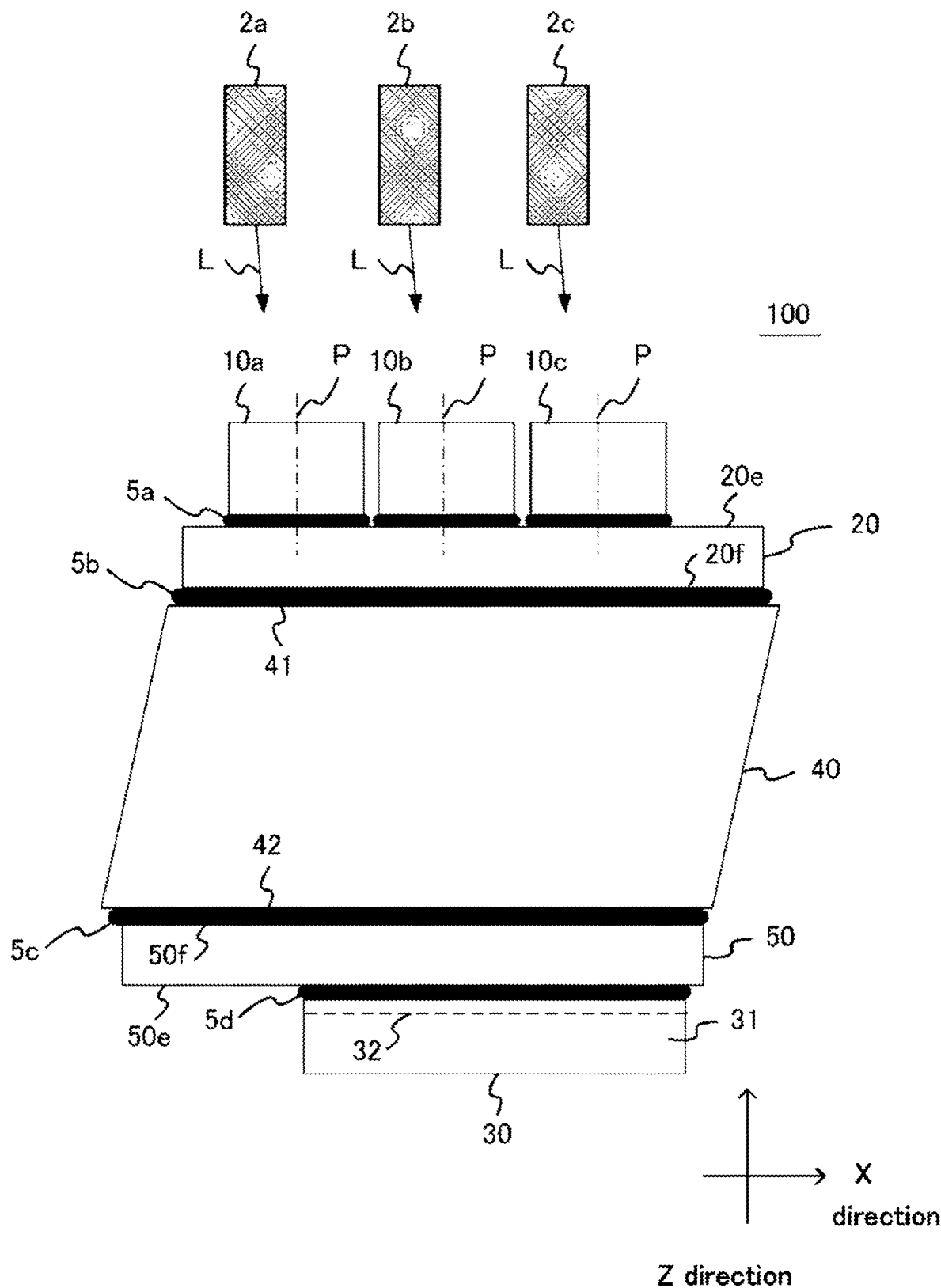
FIG. 9 is a front view for explaining the overall structure, with regard to an optical mux and demux module in accordance with Embodiment 2 of the present invention.

FIG. 9 is a front view which shows the structure of an optical mux and demux module in accordance with the present embodiment of this invention. The optical mux and demux module 100 is provided with a band pass filter 10a, a band pass filter 10b, a band pass filter 10c, a transparent block 20, a parallel block holder 40, a transparent block 50, and a mirror 30. The optical mux and demux module 100 has a function to multiplex a plurality of optical signals L, which are emitted from the laser light sources 2a to 2c and have each a different center wavelength ($\lambda$). The transparent block 20 has a filter fixing surface 20e and a block holder fixing surface 20f. The transparent block 50 has a mirror fixing surface 50e and a block holder fixing surface 50f.

One or more optical signals L impinge on each of the band pass filters 10a to 10c. The transparent block 50 (the mirror 30) as well as the transparent block 20 (the band pass filters 10a to 10c) is fixed with the parallel block holder 40. The mirror 30 reflects an optical signal L which is propagated through the parallel block holder 40. The front shape of the parallel block holder 40 is a parallelogram, according to the embodiment of the present invention. The front shape of the parallel block holder 40 can be other shapes, such as a rectangle. In order to perform the adhesion fixing of the band pass filters 10, dug portions are formed on the filter fixing surface 20e of the transparent block 20. In order to perform the adhesion fixing of the mirror 30, a dug portion is formed on the mirror fixing surface 50e of the transparent block 50.

Adhesive agents 5a fix the band pass filters 10a to 10c with the parallel block holder 40. The adhesive agent 5b fixes the transparent block 20 (the first transparent block) with the parallel block holder 40. The adhesive agent 5c fixes the parallel block holder 40 with the transparent block 50 (the second transparent block). The adhesive agent 5d fixes the mirror 30 with the transparent block 50. Ultraviolet cure adhesive agent, which becomes hardened when irradiated with ultraviolet rays, or thermosetting adhesive agent, which becomes hardened when heated, is used for the adhesive agents 5a to the adhesive agent 5d. Incidentally, it is obvious that the material of the adhesive agents 5a to the adhesive agent 5d is not limited to the ultraviolet cure adhesive agent or the thermosetting adhesive agent.

The optical signal L which is emitted from the laser light source 2a impinges on the band pass filter 10a. The optical signal L which is emitted from the laser light source 2b impinges on the band pass filter 10b. The optical signal L which is emitted from the laser light source 2c impinges on the band pass filter 10c. Each of the band pass filters 10a to 10c is an optical element which transmits only the light beam with a specific wavelength among incident light beams, and do not transmit other light beams. The band pass filters 10a to 10c correspond one to one with the laser light sources 2a to 2c, and the same number of band pass filters and laser light sources are provided there.

Each of the band pass filters 10a to 10c has an optical axis P. The optical axis P of a band pass filter 10 is shown by a dashed dotted line. The optical axes P of the band pass filters 10a to 10c are arranged in parallel keeping an interval with each other, and at the same time, on the same flat plane. The transparent block 20 is a light transmissive member which propagates optical signals L to the parallel block holder 40, where the optical signals are transmitted through the band pass filters 10a to 10c. The transparent block 50 is a light transmissive member which propagates optical signals L to the mirror 30, where the optical signals are transmitted through the parallel block holder 40.

The parallel block holder 40, which corresponds to the main body of the optical mux and demux module 100, is made out of glass or transparent resin, and has a first flat surface 42 (a first principal surface) and a second flat surface 41 (a second principal surface). In the parallel block holder 40, it is required that the first principal surface (the first flat surface 42) and the second principal surface (the second flat surface 41) are in parallel. The mirror 30 is composed of a mirror main body 31 and a reflection film 32. Although the mirror main body 31 is made out of glass or metal, the material is not limited to these substances. The transparent block 20 and the band pass filters 10 are disposed at the second principal surface side of the parallel block holder 40.

The reflection film 32 is composed of a metal film or a dielectric multi layered film, which is vapor deposited on either one of the principal surfaces of the mirror main body 31. In the present embodiment, an optical axis P is the axial center of a band pass filter 10. A direction which is parallel to the optical axes P of the band pass filters 10 is referred to as Z direction. A direction which intersects perpendicularly with the Z direction and in which the optical axes P of the band pass filters 10 are lined with each other is referred to as X direction. A direction which intersects perpendicularly with both of the X direction and the Z direction is referred to as Y direction.

Figure 10:
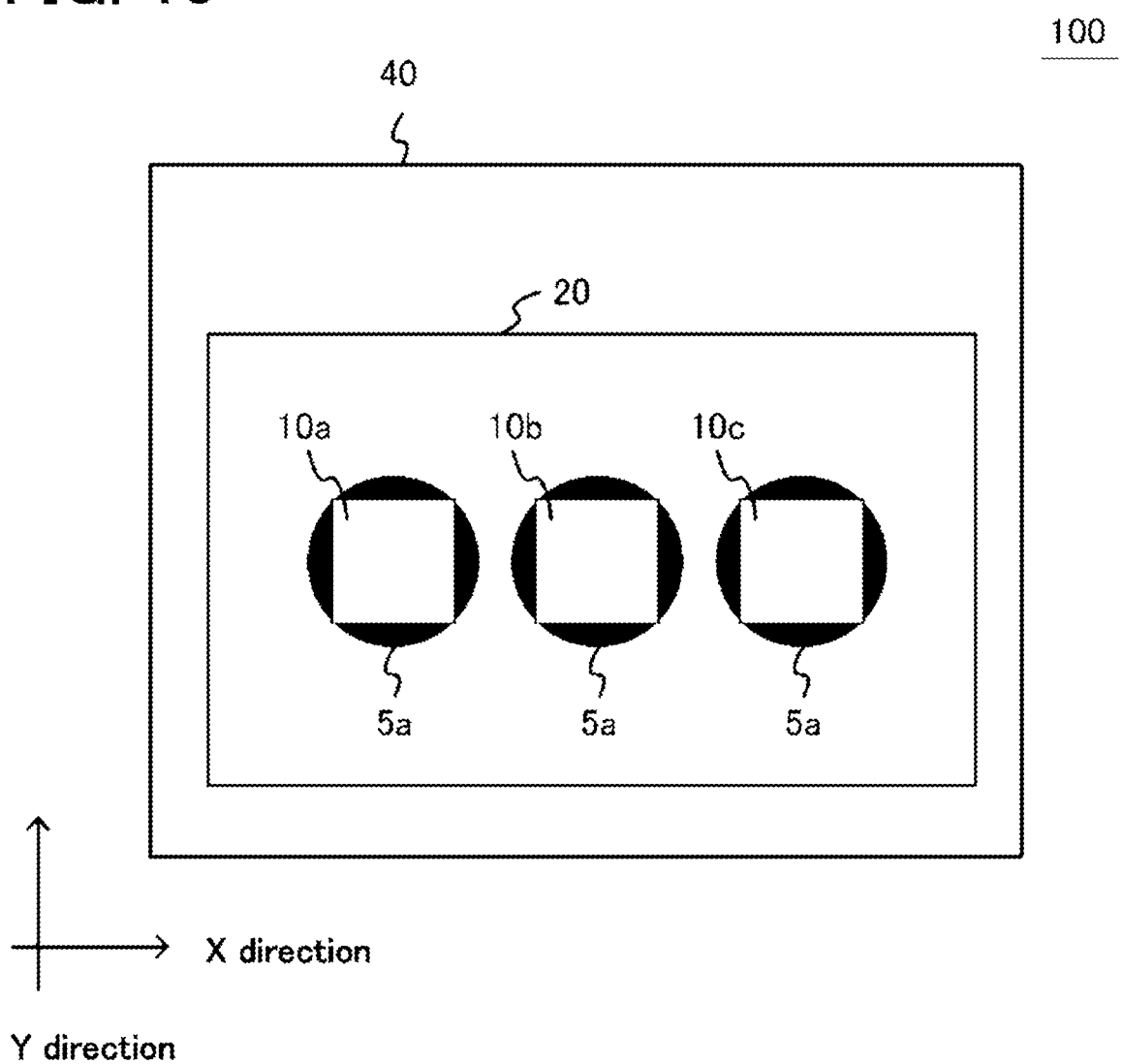
FIG. 10 is a top view for explaining the overall structure, with regard to the optical mux and demux module in accordance with Embodiment 2 of the present invention.

FIG. 10 is a top view which shows the structure of the optical mux and demux module in accordance with the present embodiment of this invention. The parallel block holder 40 is made out of glass or transparent resin. The transparent block 20 is fixed on the second principal surface (the second flat surface 41) of the parallel block holder 40, through an adhesive agent 5b. The band pass filters 10a to 10c are fixed on the upper surface (the filter fixing surface) of the transparent block 20, through adhesive agents 5a. The transparent block 50 (the mirror 30) is fixed on the first principal surface (the first flat surface 42) of the parallel block holder 40 with an adhesive agent.

Figure 11:
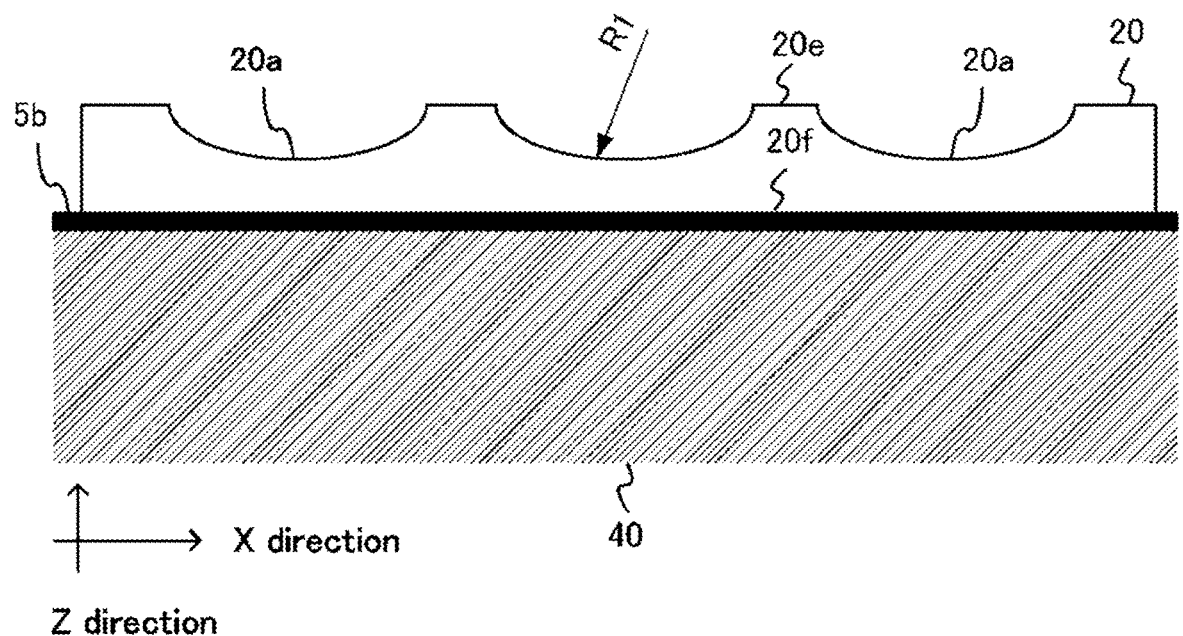
FIG. 11 is a diagram for explaining the relationship between a parallel block holder and a transparent block, in accordance with Embodiment 2 of the present invention.

FIG. 11 shows a structure between the parallel block holder 40 and the transparent block 20, in accordance with the present embodiment of this invention. The parallel block holder 40 and the transparent block 20 are fixed with the adhesive agent 5b. In the transparent block 20 which is fixed with the parallel block holder 40, hollows 20a of concave shape (dug portions), the number of which is as large as the number of the band pass filters, are provided on the joining surface (the filter fixing surface 20e) with the band pass filters 10. Each of the hollows 20a of the transparent block 20 has a curvature radius R1.

The joining surface front end of a component to be joined (each of the band pass filters 10a to 10c) has a curvature radius R. The curvature radius R1 of a hollow 20a is larger than the curvature radius R of a component to be joined (each of the band pass filters 10a to 10c). The hollows 20a of the transparent block 20 can be formed by a processing method, such as press processing, drill processing, and etching processing. Each of the band pass filters 10a to 10c is fixed with an adhesive agent which is thrown into the hollow 20a (a dug portion) of a transparent block 20.

Figure 12:
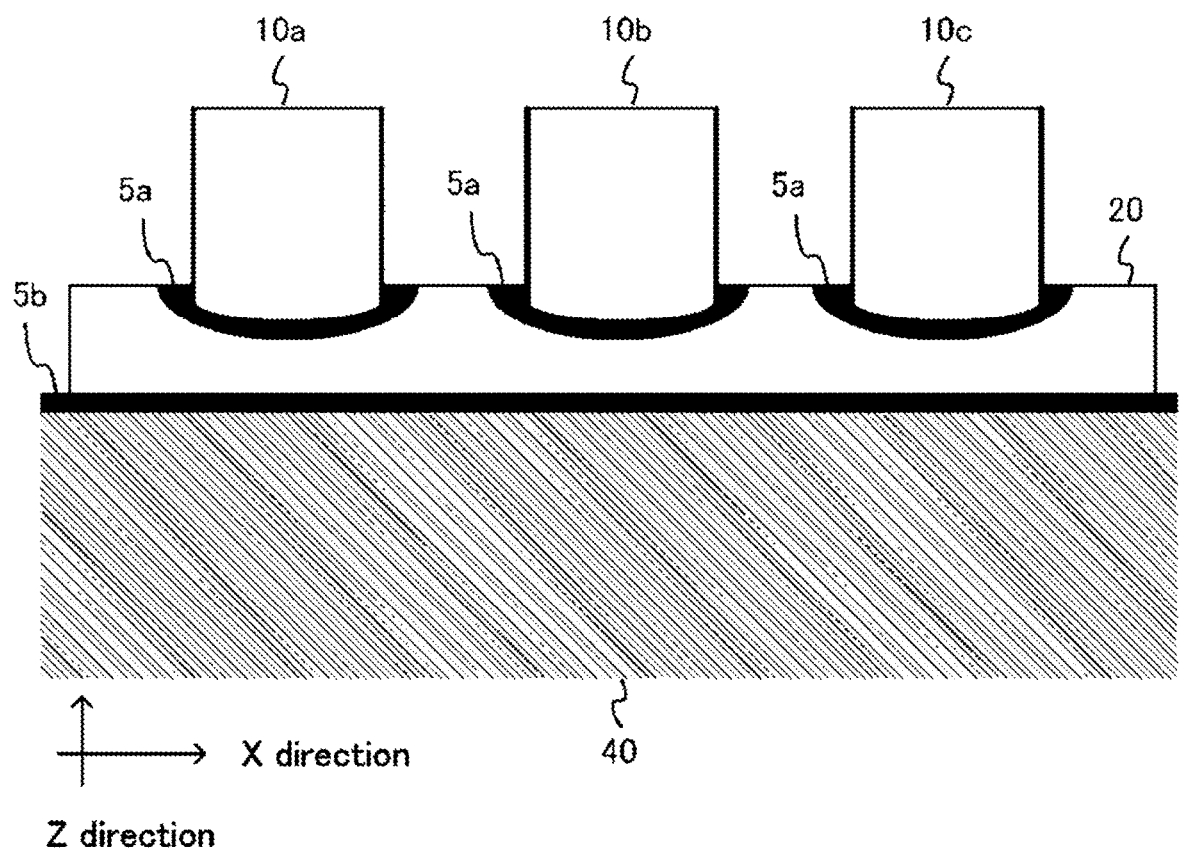
FIG. 12 is a diagram for explaining the bonding structure of band pass filters in accordance with Embodiment 2 of the present invention.

FIG. 12 shows the bonding structure between the band pass filters 10 and the transparent block 20, in accordance with the present embodiment of this invention. In the case where an optical component (a band pass filter) with a warp is disposed on a flat surface (a filter fixing surface 20e) of the transparent block 20, the contact state between the transparent block 20 and the above mentioned optical component becomes point contact. In the present bonding structure, the transparent block 20 is provided with hollows 20a of concave shape. The joining surface front ends of the band pass filters 10a to 10c have each a curvature radius R. The curvature radius R1 of the hollow 20a is larger than each curvature radius R of the band pass filters 10a to 10c.

In the present bonding structure, since the front end of a component to be joined can follow the shape of the above mentioned hollow 20a, a bonded part is in the state of surface contact, which has a larger frictional resistance, compared with point contact. According to the present bonding structure, since an optical component can have a stabilized posture shortly after the optical component is disposed on a flat surface (a filter fixing surface 20e) of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

Incidentally, in the former embodiment, shown is an optical mux and demux module which includes a hollow of concave shape, having a curvature larger than the curvature radius R of the joining surface front end of a component to be joined (a band pass filter, a mirror), where the hollow is provided in the main body (the parallel block holder) of the optical mux and demux module. In the present embodiment, a single plate material (a transparent block or a glass) and a bonding material (an adhesive agent) are provided between the main body (the parallel block holder) of an optical mux and demux module and joining material (adhesive agent) with a component to be joined (a band pass filter, a mirror).

In the present embodiment, like in the former embodiment, the optical mux and demux module includes a single plate material (a transparent block or a glass) which is provided with a hollow of concave shape, the hollow having a curvature radius larger than the curvature radius R of the joining surface front end of a component to be joined. Since an optical component can have a stabilized posture shortly after the optical component is disposed, the variation in the attachment position (angle) can be suppressed. Further, in the case where the position of the gravity center of an optical component and the center of a hollow are in agreement, the mismatch (variation) in the attachment position (angle) can be suppressed to a minimum.

Accordingly, like in the former embodiment, surface contact can be attained as the contact state between a transparent block and a component to be joined (a band pass filter, a mirror). Under these circumstances, the optical mux and demux module becomes less subject to the influence of a position (angle) mismatch, and the accuracy in the attachment position (angle) can be improved. In addition, the optical mux and demux module is configured so that an optical component (a band pass filter, a mirror) is joined with a single or multiple plate materials (transparent blocks), prior to assembling the optical component to the main body (the parallel block holder) of the optical mux and demux module. The optical mux and demux module in accordance with the present embodiment can attain a lower cost and an enhanced yield, since it becomes possible to sort out exclusively an optical component which satisfies the mismatch in the attachment position (angle).

Therefore, an optical mux and demux module in accordance with the present embodiment of this invention includes a single plate material (a glass), which is placed between a main body (a parallel block holder) of the optical mux and demux module and a joining surface, where the joining surface is formed between an optical component (a band pass filter, a mirror) which is a component to be joined and joining material (adhesive agent), wherein a hollow of concave shape, which has a curvature radius larger than the curvature radius R of the joining surface front end of a component to be joined, is provided in the above mentioned plate material (the glass).

That is to say, an optical mux and demux module in accordance with the present embodiment of this invention, includes: a mirror which has a reflective surface, a parallel block holder which has a first principal surface and a second principal surface arranged in parallel, where the mirror is disposed at a first principal surface side, a transparent block, which has a filter fixing surface and is disposed at a second principal surface side of the parallel block holder, and a plurality of band pass filters each of which has a fixing side principal surface and an incident side principal surface, where the transparent block is fixed on the fixing side principal surface, wherein dug portions, being the same in number with the band pass filters, are formed on the filter fixing surface which the transparent block has, and the band pass filters are fixed with the transparent block with an adhesive agent which is thrown into the dug portion.

Embodiment 3

In an optical mux and demux module in accordance with the present embodiment of this invention, a transparent block is bonded with the main body (the parallel block holder) of the optical mux and demux module. The single transparent block can be provided with a groove of concave shape at a joining surface, where the joining surface is formed between an optical component (a band pass filter and a mirror), which is a component to be joined, and the single joining material (the transparent block).

The optical mux and demux module 100 is provided with a band pass filter 10a, a band pass filter 10b, a band pass filter 10c, a transparent block 20, a parallel block holder 40, a transparent block 50, and a mirror 30 (refer to FIG. 9). The optical mux and demux module 100 has a function to multiplex a plurality of optical signals L, which are emitted from the laser light sources 2a to 2c and have each a different center wavelength ($\lambda$). The transparent block 20 has a filter fixing surface 20e and a block holder fixing surface 20f. The transparent block 50 has a mirror fixing surface 50e and a block holder fixing surface 50f.

One or more optical signals L impinge on each of the band pass filters 10a to 10c. The transparent block 50 (the mirror 30) as well as the transparent block 20 (the band pass filters 10a to 10c) is fixed with the parallel block holder 40. The mirror 30 reflects an optical signal L which is propagated through the parallel block holder 40. The front shape of the parallel block holder 40 is a parallelogram, in the embodiment of the present invention. The front shape of the parallel block holder 40 can be other shapes, such as a rectangle. In order to perform the adhesion fixing of the band pass filters 10, dug portions are formed on the filter fixing surface 20e of the transparent block 20. In order to perform the adhesion fixing of the mirror 30, a dug portion is formed on the mirror fixing surface 50e of the transparent block 50.

The parallel block holder 40, which corresponds to the main body of the optical mux and demux module 100, is made out of glass or transparent resin, and has a first flat surface 42 (a first principal surface) and a second flat surface 41 (a second principal surface). In the parallel block holder 40, it is required that the first principal surface (the first flat surface 42) and the second principal surface (the second flat surface 41) are in parallel. The mirror 30 is composed of a mirror main body 31 and a reflection film 32. Although the mirror main body 31 is made out of glass or metal, the material is not limited to these substances.

The reflection film 32 is composed of a metal film or a dielectric multi layered film, which is vapor deposited on either one of the principal surfaces of the mirror main body 31. In the present embodiment, an optical axis P is the axial center of a band pass filter 10. A direction which is parallel to the optical axes P of the band pass filters 10 is referred to as Z direction. A direction which intersects perpendicularly with the Z direction and in which the optical axes P of the band pass filters 10 are lined with each other is referred to as X direction. A direction which intersects perpendicularly with both of the X direction and the Z direction is referred to as Y direction.

Figure 13:
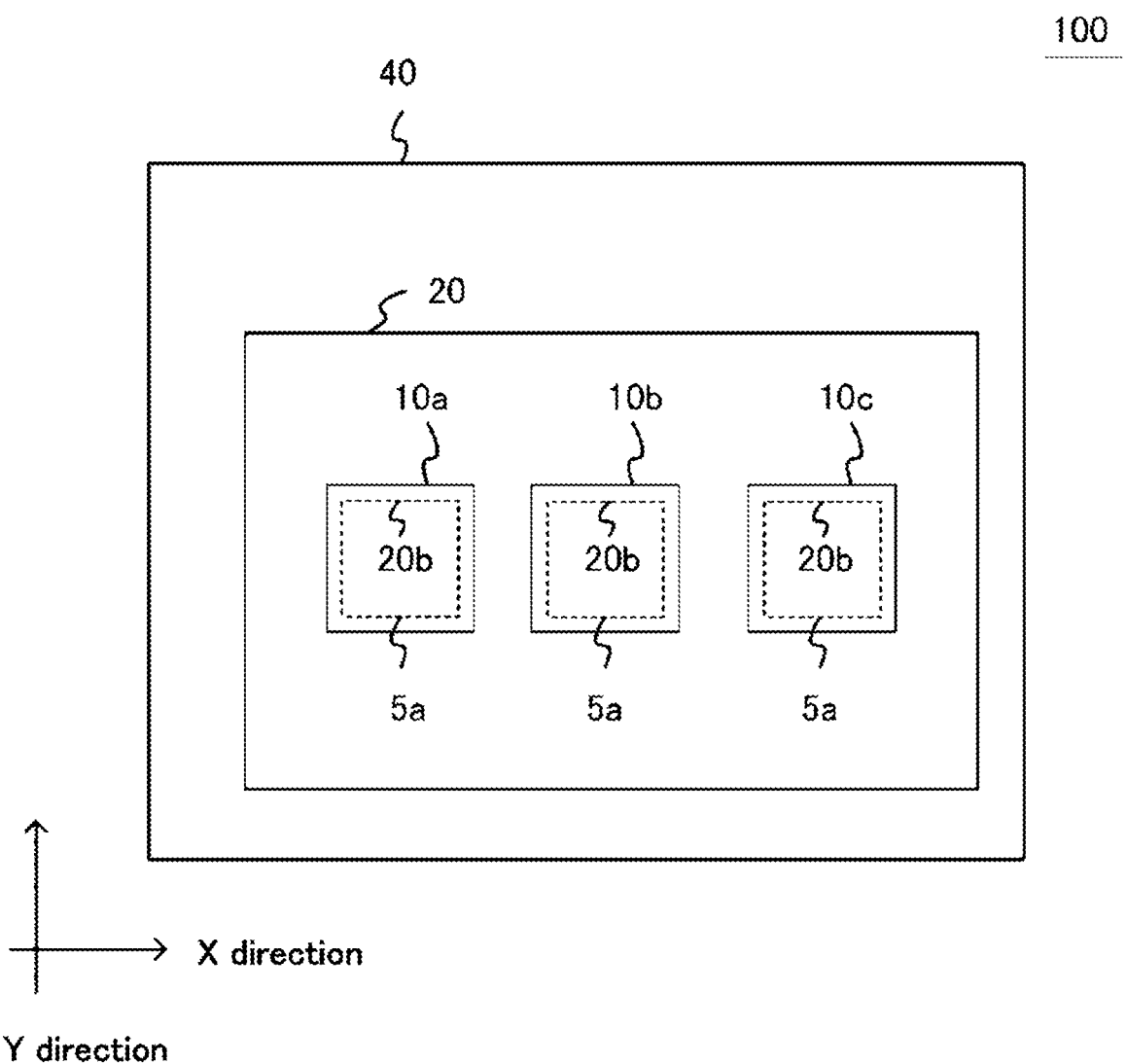
FIG. 13 is a top view for explaining the structure of a transparent block in accordance with Embodiment 3 of the present invention.

FIG. 13 is a top view which shows the structure of an optical mux and demux module in accordance with the present embodiment of this invention. The parallel block holder 40 is made out of glass or transparent resin. The transparent block 20 is fixed on the second principal surface (the second flat surface 41) of the parallel block holder 40, through an adhesive agent 5b. The band pass filters 10a to 10c are fixed on the upper surface (the filter fixing surface 20e) of the transparent block 20, through adhesive agents 5a. The transparent block 50 (the mirror 30) is fixed on the first principal surface (the first flat surface 42) of the parallel block holder 40 with an adhesive agent. In the transparent block 20, grooves 20b of concave shape are formed on the joining surface with the band pass filters 10.

Figure 14:
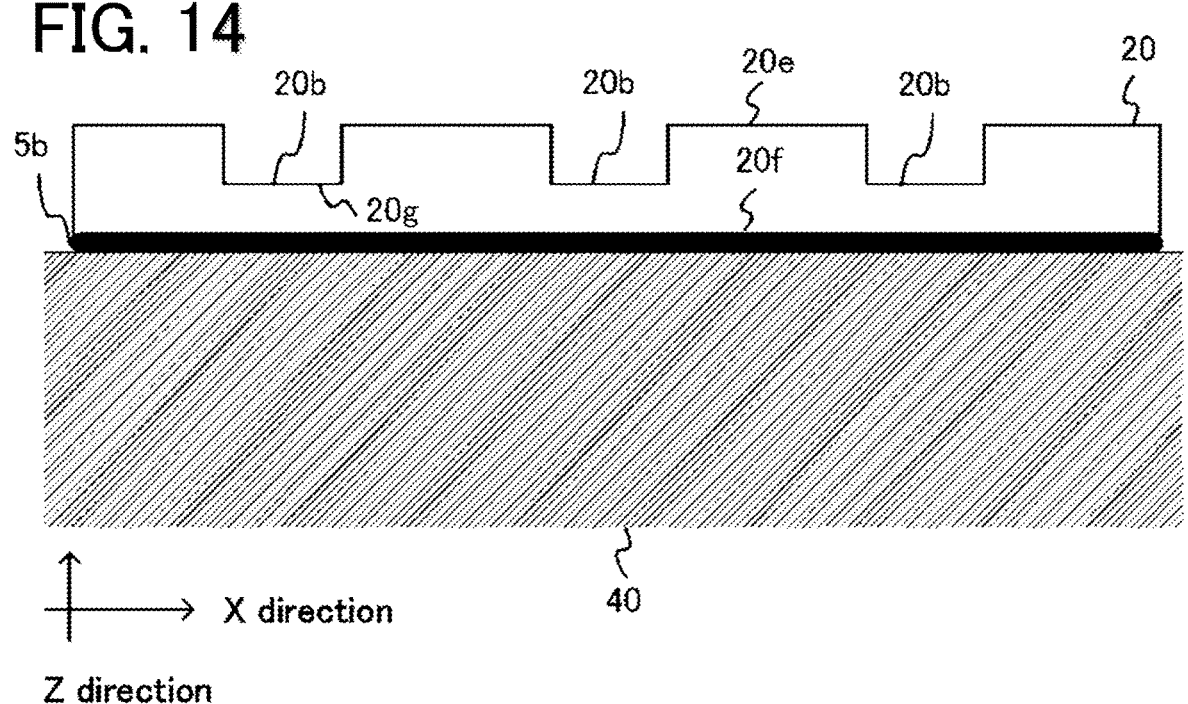
FIG. 14 is a diagram for explaining the relationship between a parallel block holder and a transparent block, in accordance with Embodiment 3 of the present invention.

FIG. 14 shows a structure between the parallel block holder 40 and the transparent block 20, in accordance with the present embodiment of this invention. The parallel block holder 40 and the transparent block 20 are fixed with the adhesive agent 5b. In the transparent block 20 which is fixed with the parallel block holder 40, grooves 20b (dug portions) of concave shape, the number of which is as large as the number of the band pass filters 10, are provided on the joining surface (the filter fixing surface 20e) with the band pass filters 10. The groove 20b of the transparent block 20 includes a base surface 20g, which is made flat. Each of the band pass filters 10a to 10c is fixed to a groove 20b of the transparent block 20 with an adhesive agent. The grooves 20b of the transparent block 20 can be formed by a processing method, such as press processing, drill processing, and etching processing.

Figure 15:
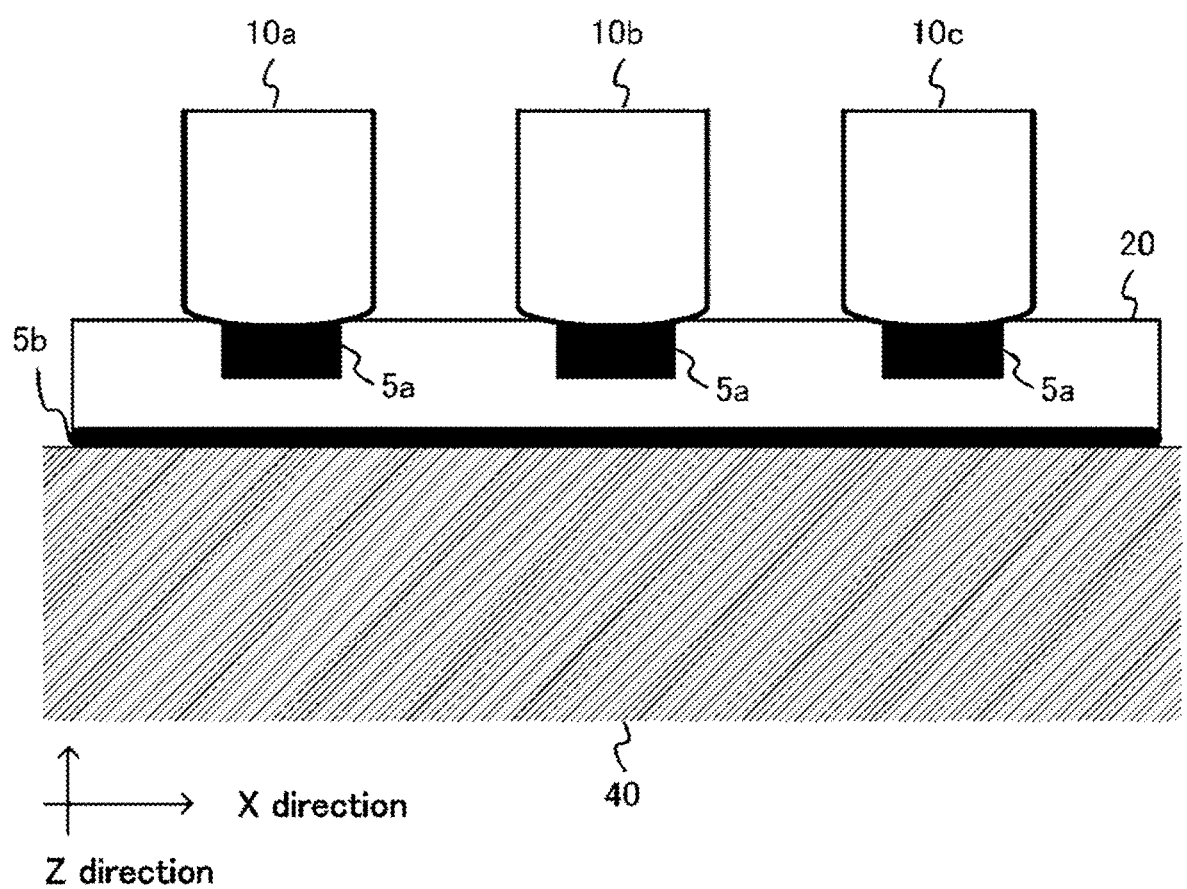
FIG. 15 is a diagram for explaining the bonding structure between a transparent block and band pass filters, in accordance with Embodiment 3 of the present invention.

FIG. 15 shows a bonding structure between the band pass filters 10 and the transparent block 20, in accordance with the present embodiment of this invention. In the case where an optical component (a band pass filter) with a warp is disposed on a flat surface (a filter fixing surface 20e) of the transparent block 20, the contact state between the transparent block 20 and the above mentioned optical component becomes point contact. In the present bonding structure, the transparent block 20 is provided with grooves 20b of concave shape.

In the present bonding structure, since the front end of a component to be joined can follow the shape of a groove 20b, a bonded part is in the state of surface contact, which has a larger frictional resistance, compared with point contact. According to the present bonding structure, since an optical component can have a stabilized posture shortly after the optical component is disposed on a flat surface of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

According to the present bonding structure, since a single plate material (a transparent block) is provided with a groove of concave shape, an optical component can have a stabilized posture shortly after the optical component is disposed. Under these circumstances, the mismatch (variation) in the attachment position (angle) can be suppressed, and in addition, in the case where the position of the gravity center of an optical component and the center of a hollow are in agreement, the mismatch (variation) in the attachment position (angle) can be suppressed to a minimum.

Further, according to the present bonding structure, an optical mux and demux module is in the state of line contact, which has a larger frictional resistance, compared with a point contact structure, regarding the contact state between a main body (a parallel block holder and a transparent block) of the optical mux and demux module and a component to be joined (a band pass filter and a mirror). Under these circumstances, the optical mux and demux module becomes less subject to the influence of a position (angle) mismatch, and the accuracy in the attachment position (angle) can be improved. Further, like in the former embodiment, the optical mux and demux module is configured so that an optical component (a band pass filter and a mirror) is joined with a single plate material (a transparent block), prior to assembling the component to be joined (the band pass filter and the mirror) with the main body (the parallel block holder) of the optical mux and demux module. The optical mux and demux module can attain a lower cost and an enhanced yield, since it becomes therefore possible to manufacture an optical mux and demux module, by sorting out exclusively an optical component which satisfies the mismatch in the attachment position (angle).

Accordingly, in an optical mux and demux module in accordance with the present embodiment of this invention, a transparent block is bonded with the main body (the parallel block holder) of the optical mux and demux module. The single transparent block is provided with a groove of concave shape at a joining surface, where the joining surface is formed between an optical component (a band pass filter and a mirror) which is a component to be joined and the single joining material (the transparent block).

Embodiment 4

In an optical mux and demux module in accordance with the present embodiment of this invention, transparent blocks are bonded with the main body (the parallel block holder) of the optical mux and demux module. A plurality of transparent block elements can be provided with a hollow of concave shape, at a joining surface, where the joining surface is formed between an optical component (a band pass filter and a mirror) which is a component to be joined and the plurality of joining materials (the transparent block elements).

Figure 16:
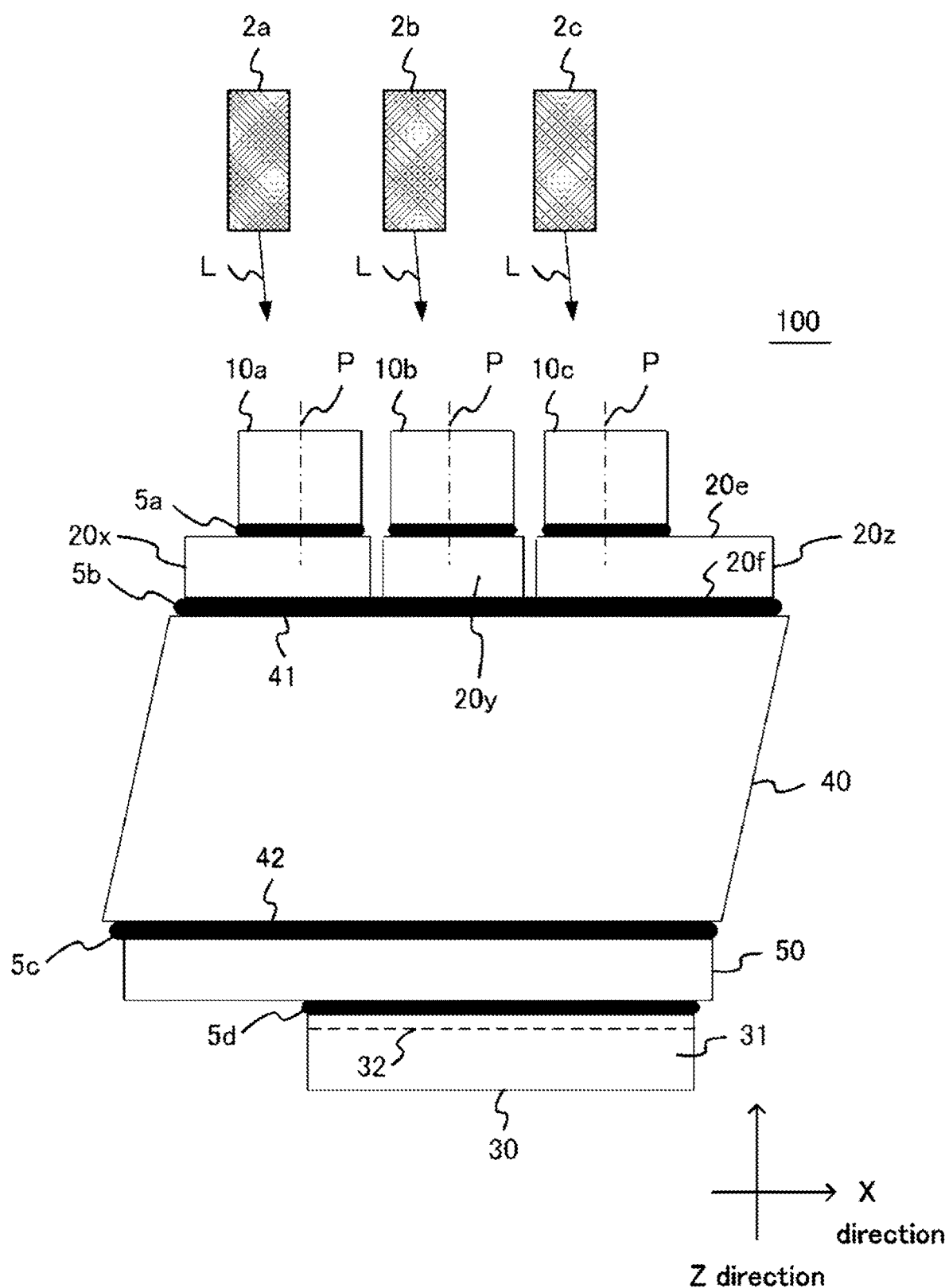
FIG. 16 is a front view for explaining the overall structure, with regard to an optical mux and demux module in accordance with Embodiment 4 of the present invention.

FIG. 16 is a front view which shows the structure of an optical mux and demux module, in accordance with the present embodiment of this invention. The optical mux and demux module 100 is composed of a band pass filter 10a, a band pass filter 10b, a band pass filter 10c, transparent blocks 20 (a transparent block element 20x, a transparent block element 20y, and a transparent block element 20z), a parallel block holder 40, a transparent block 50, and a mirror 30. The optical mux and demux module 100 has a function to multiplex a plurality of optical signals L, which are emitted from the laser light sources 2a to 2c and have each a different center wavelength (λ).

One or more optical signals L impinge on each of the band pass filters 10a to 10c. The transparent block 50 (the mirror 30) as well as the transparent blocks 20 (the band pass filters 10a to 10c) is fixed with the parallel block holder 40. The mirror 30 reflects an optical signal L which is propagated through the parallel block holder 40. The front shape of the parallel block holder 40 is a parallelogram, in the embodiment of the present invention. The front shape of the parallel block holder 40 can be other shapes, such as a rectangle.

Adhesive agents 5a fix the band pass filters 10a to 10c with the parallel block holder 40. Adhesive agents 5b fix the transparent blocks 20 (the transparent block element 20x, the transparent block element 20y, and the transparent block element 20z) with the parallel block holder 40. The adhesive agent 5c fixes the parallel block holder 40 with the transparent block 50. The adhesive agent 5d fixes the mirror 30 with the transparent block 50. Ultraviolet cure adhesive agent, which becomes hardened when irradiated with ultraviolet rays, or thermosetting adhesive agent, which becomes hardened when heated, is used for the adhesive agents 5a to the adhesive agent 5d. Incidentally, it is obvious that the material of the adhesive agents 5a to the adhesive agent 5d is not limited to the ultraviolet cure adhesive agent or the thermosetting adhesive agent.

The optical signal L which is emitted from the laser light source 2a impinges on the band pass filter 10a. The optical signal L which is emitted from the laser light source 2b impinges on the band pass filter 10b. The optical signal L which is emitted from the laser light source 2c impinges on the band pass filter 10c. Each of the band pass filters 10a to 10c is an optical element which transmits only the light beam with a specific wavelength among incident light beams, and do not transmit other light beams. The band pass filters 10a to 10c correspond one to one with the laser light sources 2a to 2c, and the same number of band pass filters and laser light sources are provided there. Each of the band pass filters 10a to 10c has an optical axis P. The optical axis P of a band pass filter 10 is shown by a dashed dotted line.

The optical axes P of the band pass filters 10a to 10c are arranged in parallel keeping an interval with each other, and at the same time, on the same flat plane. The transparent block element 20x, the transparent block element 20y, and the transparent block element 20z are light transmissive members which propagate optical signals L to the parallel block holder 40, where the optical signals are transmitted through the band pass filters 10a to 10c. The transparent block 50 is a light transmissive member which propagates optical signals L to the mirror 30, where the optical signals are transmitted through the parallel block holder 40. The parallel block holder 40, which corresponds to the main body of the optical mux and demux module 100, is made out of glass or transparent resin, and has a first flat surface 42 (a first principal surface) and a second flat surface 41 (a second principal surface). In the parallel block holder 40, it is required that the first flat surface 42 and the second flat surface 41 are in parallel.

The mirror 30 is composed of a mirror main body 31 and a reflection film 32. Although the mirror main body 31 is made out of glass or metal, the material is not limited to these substances. The reflection film 32 is composed of a metal film or a dielectric multi layered film, which is vapor deposited on either one of the principal surfaces of the mirror main body 31. In the present embodiment, an optical axis P is the axial center of a band pass filter 10. A direction which is parallel to the optical axes P of the band pass filters 10 is referred to as Z direction. A direction which intersects perpendicularly with the Z direction and in which the optical axes P of the band pass filters 10 are lined with each other is referred to as X direction. A direction which intersects perpendicularly with both of the X direction and the Z direction is referred to as Y direction.

Figure 17:
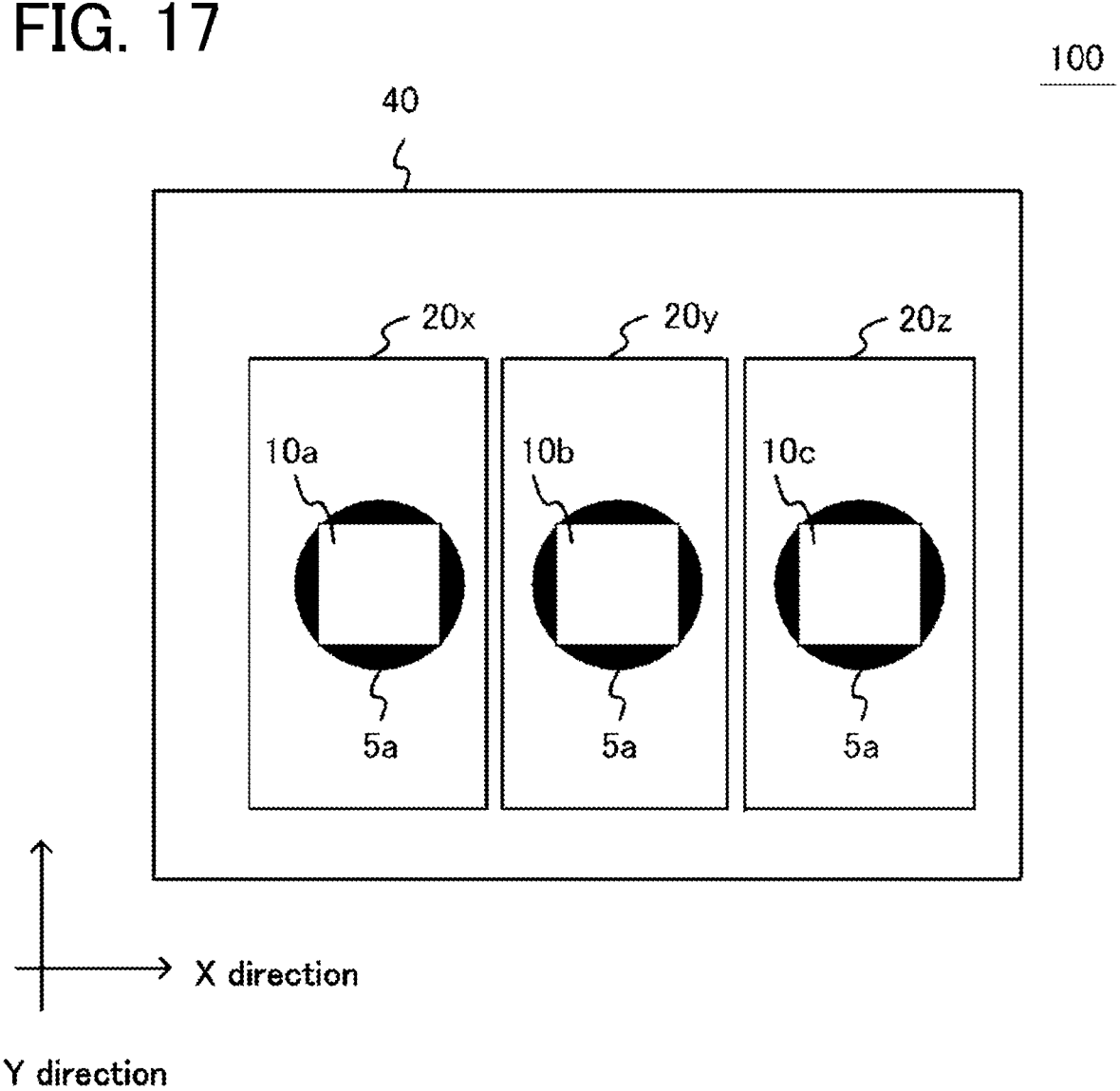
FIG. 17 is a top view for explaining the structure of a transparent block in accordance with Embodiment 4 of the present invention.

FIG. 17 is a top view which shows the structure of an optical mux and demux module in accordance with the present embodiment of this invention. The parallel block holder 40 is made out of glass or transparent resin. The transparent blocks 20 (the transparent block element 20x, the transparent block element 20y, and the transparent block element 20z) are fixed on the second principal surface (the second flat surface 41) of the parallel block holder 40, through adhesive agents 5b.

The band pass filter 10a is fixed on the upper surface of the transparent block element 20x, through an adhesive agent 5a. The band pass filter 10b is fixed on the upper surface of the transparent block element 20y, through an adhesive agent 5a. The band pass filter 10c is fixed on the upper surface of the transparent block element 20z, through an adhesive agent 5a. The transparent block 50 (the mirror 30) is fixed on the lower surface of the parallel block holder 40 with an adhesive agent.

Figure 18:
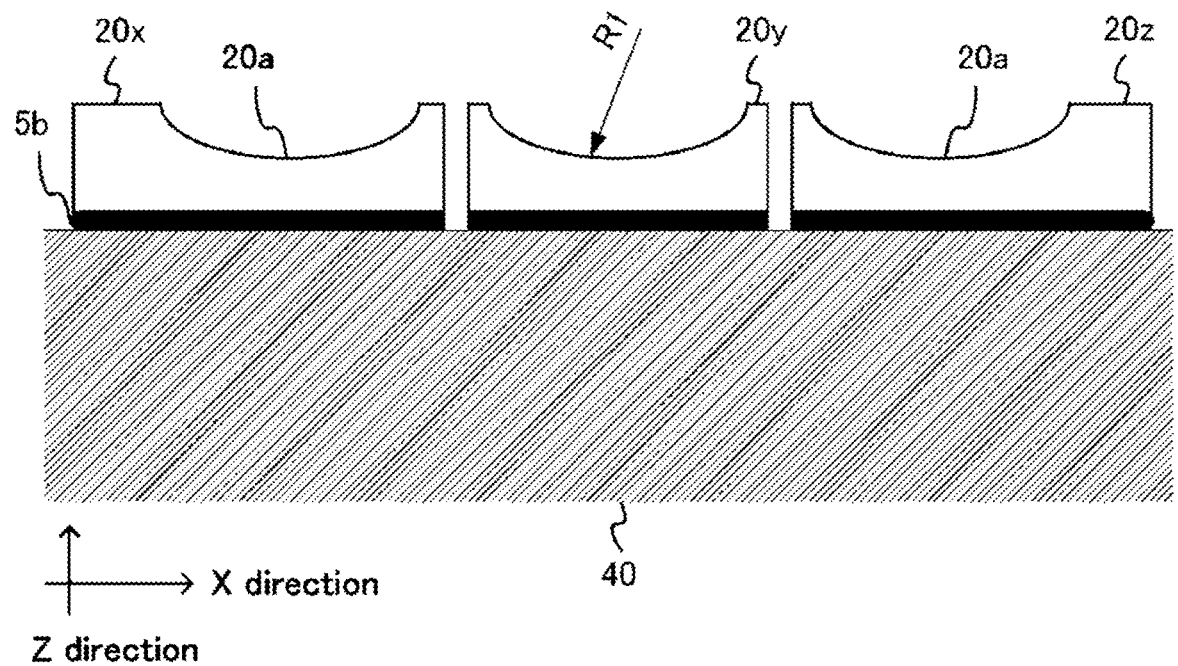
FIG. 18 is a diagram for explaining the relationship between a parallel block holder and transparent blocks in accordance with Embodiment 4 of the present invention.

FIG. 18 shows a structure between the parallel block holder 40 and the transparent blocks 20 (the transparent block element 20x, the transparent block element 20y, and the transparent block element 20z), in accordance with the present embodiment of this invention. Each of the transparent block elements 20x to 20z, which are fixed with the parallel block holder 40, includes a hollow 20a of concave shape, which is provided on the joining surface with a band pass filter 10. The hollow 20a of a transparent block 20 has a curvature radius R1. Each of the band pass filters 10a to 10c is fixed to the hollow 20a of a transparent block 20 with an adhesive agent.

The joining surface front end of a component to be joined (each of the band pass filters 10a to 10c) has a curvature radius R. The curvature radius R1 of a hollow 20a is larger than the curvature radius R of a component to be joined (each of the band pass filters 10a to 10c). The hollows 20a of the transparent blocks 20 (the transparent block element 20x, the transparent block element 20y, and the transparent block element 20z) can be formed by a processing method, such as press processing, drill processing, and etching processing.

Figure 19:
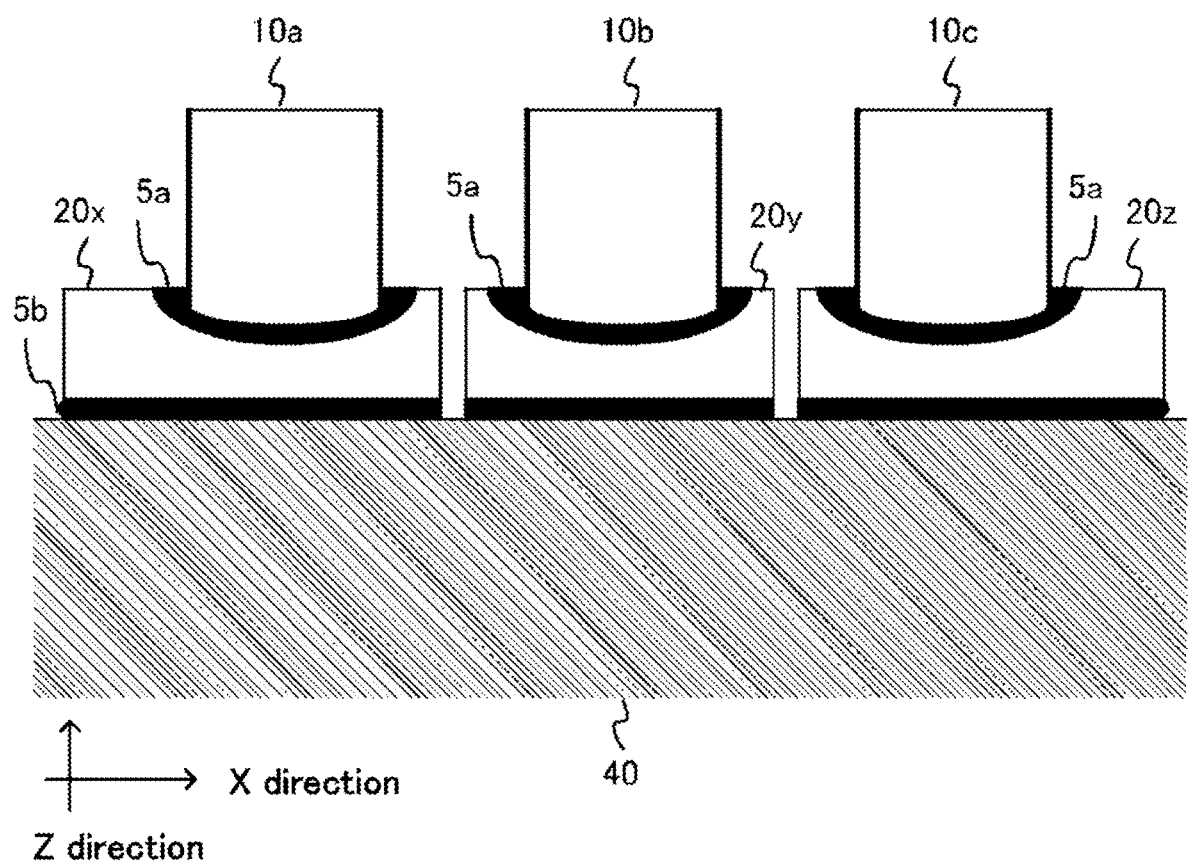
FIG. 19 is a diagram for explaining the bonding structure between transparent blocks and band pass filters, in accordance with Embodiment 4 of the present invention.

FIG. 19 shows a bonding structure between the band pass filters 10 and the transparent blocks 20, in accordance with the present embodiment of this invention. In the case where an optical component (a band pass filter) with a warp is disposed on a flat surface (a filter fixing surface 20e) of a transparent block 20 (a transparent block element 20x, a transparent block element 20y, and a transparent block element 20y), the contact state between the transparent block 20 and the above mentioned optical component becomes point contact. In the present bonding structure, each of the transparent blocks 20 is provided with a hollow 20a of concave shape. The joining surface front ends of the band pass filters 10a to 10c have each a curvature radius R. The curvature radius R1 of a hollow 20a is larger than the curvature radiuses R of the band pass filters 10a to 10c.

In the present bonding structure, since the front end of a component to be joined can follow the shape of the above mentioned hollow 20a, a bonded part is in the state of surface contact, which has a larger frictional resistance, compared with point contact. According to the present bonding structure, since an optical component can have a stabilized posture shortly after the optical component is disposed on a flat surface of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

According to the present bonding structure, like in the former embodiment, the optical mux and demux module is in the state of surface contact or line contact, which has a larger frictional resistance, compared with a point contact structure, regarding the contact state between the main body (the parallel block holder and the transparent block) of the optical mux and demux module and a component to be joined (a band pass filter and a mirror). Under these circumstances, in the case where the position of the gravity center of an optical component and the center of a hollow are in agreement, the mismatch (variation) in the attachment position (angle) can be suppressed to a minimum.

Further, according to the present bonding structure, since the optical mux and demux module is in the state of surface contact or line contact, which has a larger frictional resistance, compared with a conventional point contact, the optical mux and demux module becomes less subject to the influence of a position (angle) mismatch, and the accuracy in the attachment position (angle) can be improved, compared with a conventional module.

Therefore, in an optical mux and demux module in accordance with the embodiment of the present invention, like in the former embodiment, the optical mux and demux module is configured so that band pass filters are joined with a plurality of plate materials (transparent block elements), prior to assembling the optical components (the band pass filters) with the main body (the parallel block holder) of the optical mux and demux module. The optical mux and demux module can attain a lower cost and an enhanced yield, since it becomes possible to manufacture an optical mux and demux module, by sorting out exclusively an optical component which satisfies the mismatch in the attachment position (angle). An optical mux and demux module in accordance with the embodiment of the present invention, includes plate materials (transparent block elements), consisting of a plurality of divided bodies, which are placed between the main body (the parallel block holder and the transparent block) of the optical mux and demux module and a joining surface, where the joining surface is formed on joining material (adhesive agent) with an optical component (a band pass filter) which is a component to be joined. The above mentioned plate material is provided with a hollow of concave shape.

Embodiment 5

In an optical mux and demux module in accordance with the present embodiment of this invention, a transparent block is bonded with the main body (the parallel block holder) of the optical mux and demux module. A plurality of transparent block elements are each allowed to be provided with a groove of concave shape at a joining surface, where the joining surface is formed between an optical component (a band pass filter and a mirror), which is a component to be joined, and the plurality of joining materials (transparent block elements).

The optical mux and demux module 100 in accordance with the present embodiment is provided with a band pass filter 10a, a band pass filter 10b, a band pass filter 10c, transparent blocks 20 (a transparent block element 20x, a transparent block element 20y, and a transparent block element 20z), a parallel block holder 40, a transparent block 50, and a mirror 30 (refer to FIG. 16). The optical mux and demux module 100 has a function to multiplex a plurality of optical signals L, which are emitted from the laser light sources 2a to 2c and have each a different center wavelength (λ).

One or more optical signals L impinge on each of the band pass filters 10a to 10c. The transparent block 50 (the mirror 30) as well as the transparent blocks 20 (the band pass filters 10a to 10c) is fixed with the parallel block holder 40. The mirror 30 reflects an optical signal L which is propagated through the parallel block holder 40. The front shape of the parallel block holder 40 is a parallelogram, in the embodiment of the present invention. The front shape of the parallel block holder 40 can be other shapes, such as a rectangle.

Adhesive agents 5a fix the band pass filters 10a to 10c with the parallel block holder 40. Adhesive agents 5b fix the transparent blocks 20 with the parallel block holder 40. The adhesive agent 5c fixes the parallel block holder 40 and the transparent block 50. The adhesive agent 5d fixes the mirror 30 and the transparent block 50. Ultraviolet cure adhesive agent, which becomes hardened when irradiated with ultraviolet rays, or thermosetting adhesive agent, which becomes hardened when heated, is used for the adhesive agents 5a to the adhesive agent 5d. Incidentally, it is obvious that the material of the adhesive agents 5a to the adhesive agent 5d is not limited to the ultraviolet cure adhesive agent or the thermosetting adhesive agent.

Optical signals L which are emitted from light emitting devices, the laser light sources 2a to 2c, enter the band pass filters 10a to 10c. Each of the band pass filters 10a to 10c is an optical element which transmits only the light beam with a specific wavelength among incident light beams, and do not transmit other light beams. The band pass filters 10a to 10c correspond one to one with the laser light sources 2a to 2c, and the same number of band pass filters and laser light sources are provided there. Each of the band pass filters 10a to 10c has an optical axis P, and the optical axis P is shown by a dashed dotted line.

The optical axes P of the band pass filters 10a to 10c are arranged in parallel keeping an interval with each other, and at the same time, on the same flat plane. The transparent blocks 20 (the transparent block element 20x, the transparent block element 20y, and the transparent block element 20z) are light transmissive members which propagate optical signals L to the parallel block holder 40, where the optical signals are transmitted through the band pass filters 10a to 10c. The transparent block 50 is a light transmissive member which propagates optical signals L to the mirror 30, where the optical signals are transmitted through the parallel block holder 40. The parallel block holder 40, which corresponds to the main body of the optical mux and demux module 100, is made out of glass or transparent resin, and has a first flat surface 42 and a second flat surface 41. In the parallel block holder 40, it is required that the first flat surface 42 and the second flat surface 41 are in parallel.

The mirror 30 is composed of a mirror main body 31 and a reflection film 32. The mirror main body 31 is made out of glass or metal. The reflection film 32 is composed of a metal film or a dielectric multi layered film, which is vapor deposited on either one of the principal surfaces of the mirror main body 31. In the present embodiment, an optical axis P is the axial center of a band pass filter 10. A direction which is parallel to the optical axes P of the band pass filters 10 is referred to as Z direction. A direction which intersects perpendicularly with the Z direction and in which the optical axes P of the band pass filters 10 are lined with each other is referred to as X direction. A direction which intersects perpendicularly with both of the X direction and the Z direction is referred to as Y direction.

Figure 20:
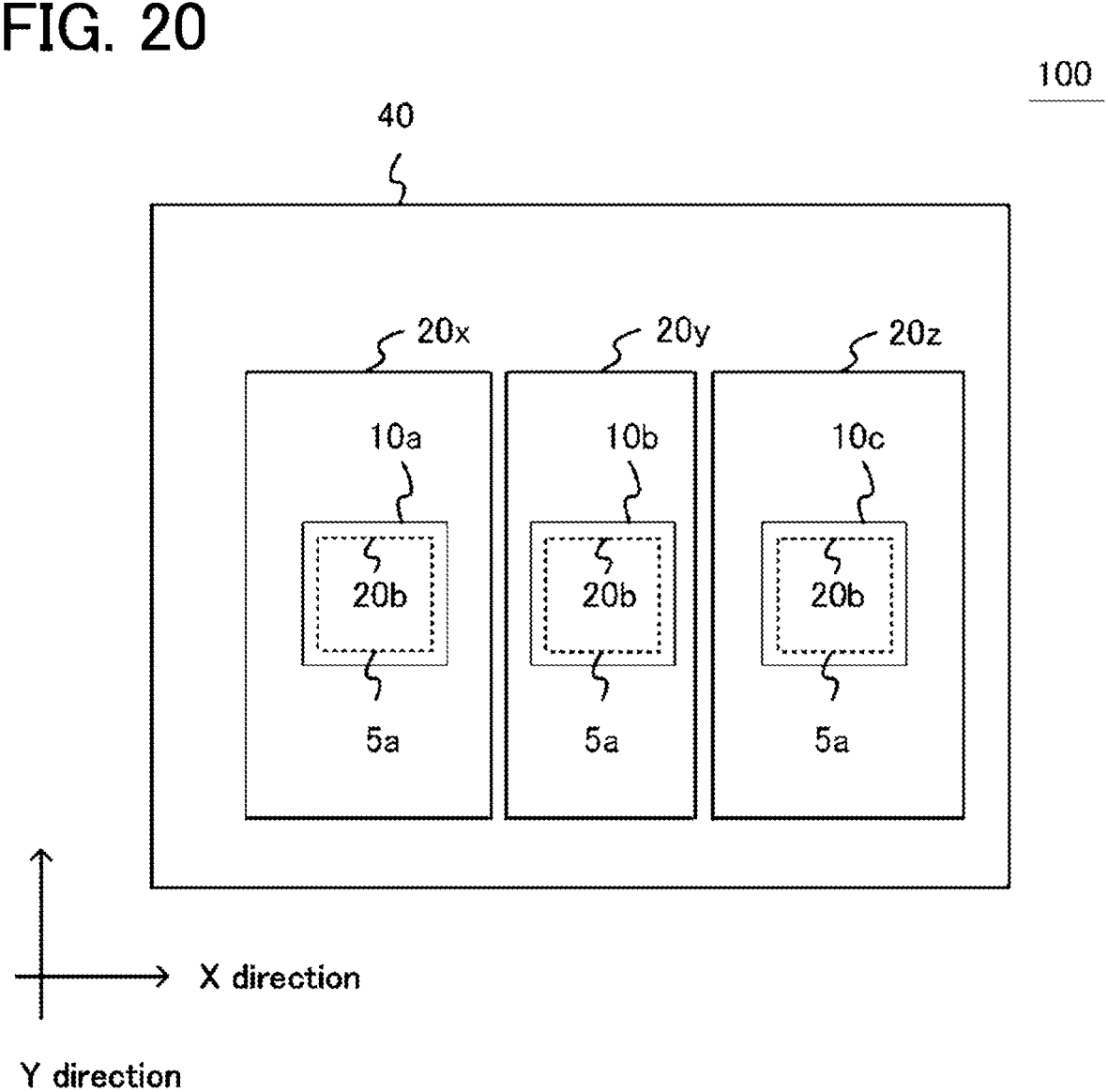
FIG. 20 is a top view for explaining the structure of transparent blocks in accordance with Embodiment 5 of the present invention.

FIG. 20 is a top view which shows the structure of an optical mux and demux module in accordance with the present embodiment of this invention. The parallel block holder 40 is made out of glass or transparent resin. The transparent blocks 20 (the transparent block element 20x, the transparent block element 20y, and the transparent block element 20z) are fixed on the second principal surface (the second flat surface 41) of the parallel block holder 40, through adhesive agents 5b.

The band pass filter 10a is fixed on the upper surface (the filter fixing surface 20e) of the transparent block element 20x, through an adhesive agent 5a. The band pass filter 10b is fixed on the upper surface (the filter fixing surface 20e) of the transparent block element 20y, through an adhesive agent 5a. The band pass filter 10c is fixed on the upper surface (the filter fixing surface 20e) of the transparent block element 20z, through an adhesive agent 5a. The transparent block 50 (the mirror 30) is fixed on the lower surface of the parallel block holder 40 with an adhesive agent. The transparent block element 20x, the transparent block element 20y, and the transparent block element 20z each include a groove 20b of concave shape, which is formed on the joining surface with each of the band pass filters 10a to 10c.

Figure 21:
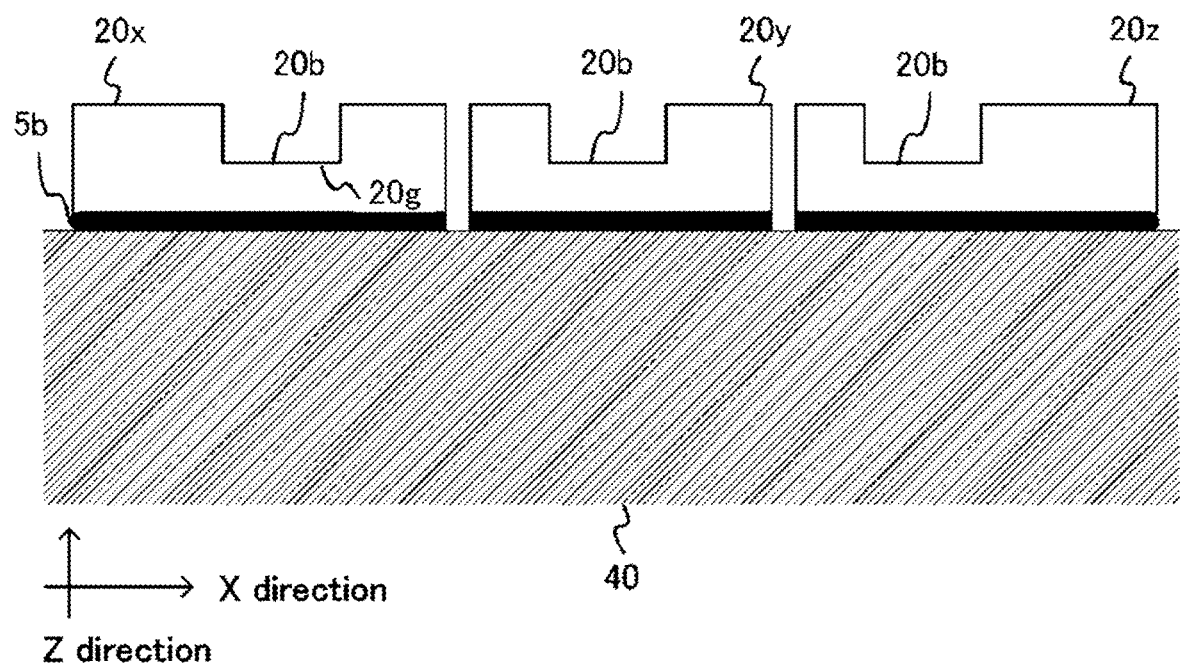
FIG. 21 is a diagram for explaining the relationship between a parallel block holder and transparent blocks, in accordance with Embodiment 5 of the present invention.

FIG. 21 shows a structure between the parallel block holder 40 and the transparent blocks 20, in accordance with the present embodiment of this invention. In the transparent blocks 20 (the transparent block element 20x, the transparent block element 20y, and the transparent block element 20z) which are fixed with the parallel block holder 40, grooves 20b (dug portions) of concave shape, the number of which is as large as the number of the band pass filters 10, are provided on the joining surface with the band pass filters 10. Each of the band pass filters 10a to 10c is fixed with an adhesive agent which is thrown into the groove 20b of a transparent block 20. The groove 20b of a transparent block 20 can be formed by a processing method, such as press processing, drill processing, and etching processing.

Figure 22:
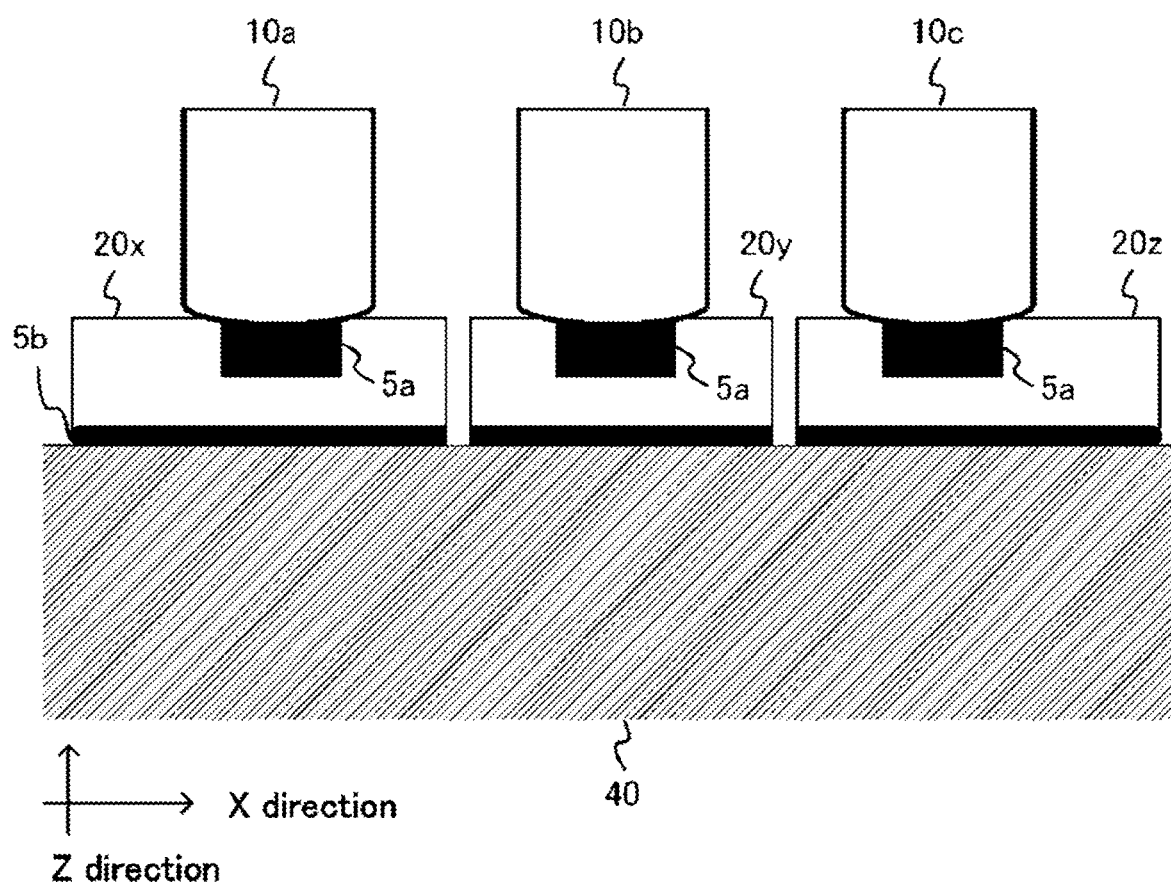
FIG. 22 is a diagram for explaining the bonding structure between transparent blocks and band pass filters, in accordance with Embodiment 5 of the present invention.

FIG. 22 shows a bonding structure between the band pass filters 10 and the transparent block 20, in accordance with the present embodiment of this invention. In the case where an optical component (a band pass filter) with a warp is disposed on a flat surface (a filter fixing surface 20e) of a transparent block 20 (a transparent block element 20x, a transparent block element 20y, and a transparent block element 20y), the contact state between the transparent block 20 and the above mentioned optical component becomes point contact. In the present bonding structure, the transparent block 20 is provided with a groove 20b of concave shape.

In the present bonding structure, since the front end of a component to be joined can follow the shape of the groove 20b, a bonded part is in the state of surface contact, which has a larger frictional resistance, compared with point contact. According to the present bonding structure, since an optical component can have a stabilized posture shortly after the optical component is disposed on a flat surface of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

Embodiment 6

In an optical mux and demux module in accordance with the present embodiment of this invention, a transparent block is bonded with the main body (the parallel block holder) of the optical mux and demux module. In the transparent block, a hollow of concave shape is provided at a joining surface, where the joining surface is formed between an optical component (a band pass filter and a mirror), which is a component to be joined, and a joining material (a transparent block element). The hollow is allowed to be provided with a through hole.

The optical mux and demux module 100 in accordance with the present embodiment of this invention is composed of a band pass filter 10a, a band pass filter 10b, a band pass filter 10c, a transparent block 20, a parallel block holder 40, a transparent block 50, and a mirror 30 (refer to FIG. 9 and FIG. 16). The optical mux and demux module 100 has a function to multiplex a plurality of optical signals L, which are emitted from the laser light sources 2a to 2c and have each a different center wavelength ($\lambda$).

One or more optical signals L impinge on each of the band pass filters 10a to 10c. The mirror 30 as well as the band pass filters 10a to 10c is fixed with the parallel block holder 40. The mirror 30 reflects an optical signal L which is propagated through the parallel block holder 40. The front shape of the parallel block holder 40 is a parallelogram, in the embodiment of the present invention. The front shape of the parallel block holder 40 can be other shapes, such as a rectangle.

Figure 23:
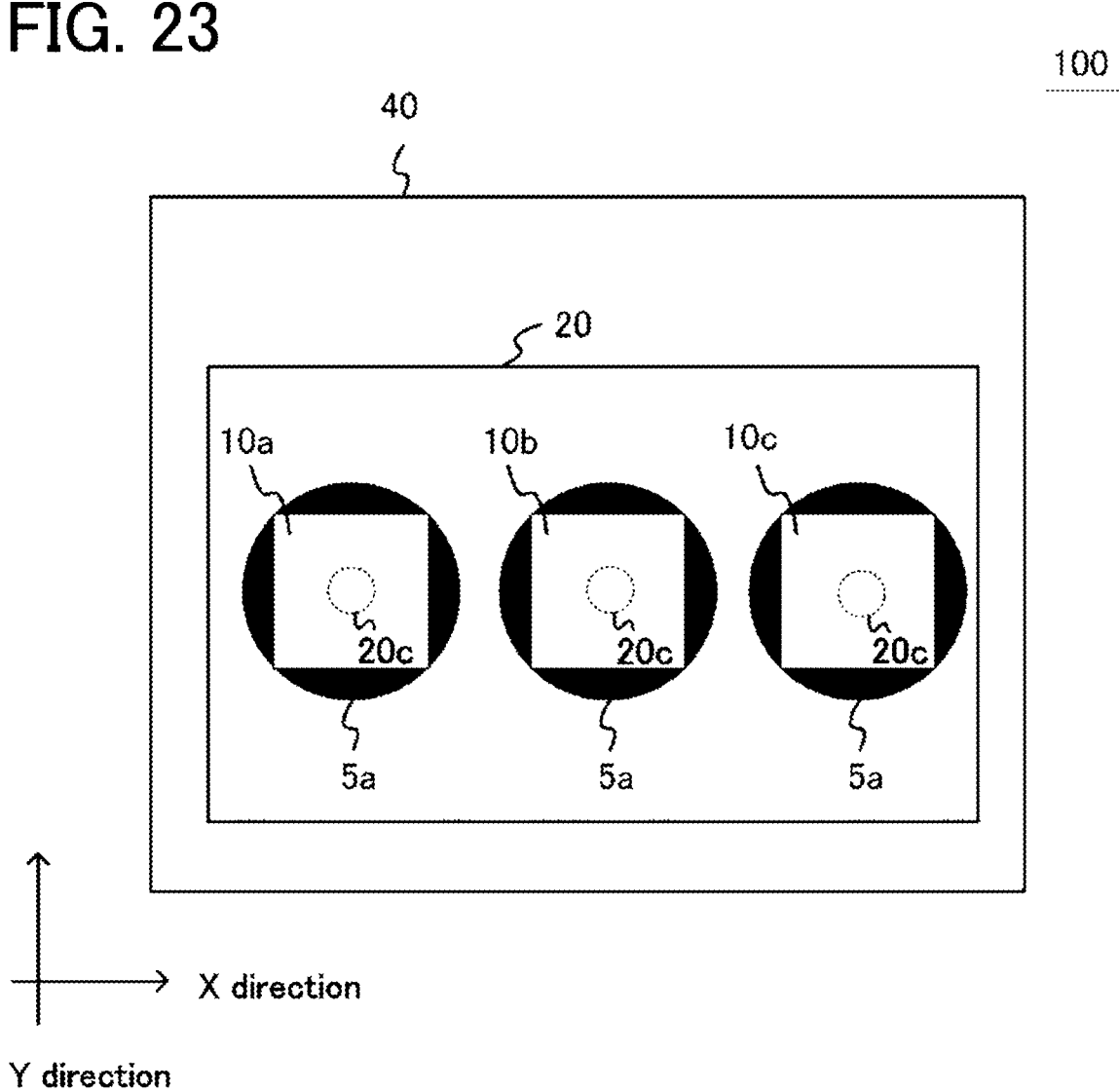
FIG. 23 is a top view for explaining the structure of a transparent block in accordance with Embodiment 6 of the present invention.

FIG. 23 is a top view which shows the structure of an optical mux and demux module in accordance with the present embodiment of this invention. The parallel block holder 40 is made out of glass or transparent resin. The transparent block 20 is fixed on the second principal surface (the second flat surface 41) of the parallel block holder 40, through an adhesive agent 5b. Each of the band pass filters 10a to 10c is fixed on the upper surface (the filter fixing surface 20e) of the transparent block 20, through an adhesive agent 5a. The transparent block 50 (the mirror 30) is fixed on the lower surface of the parallel block holder 40 with an adhesive agent. Through holes 20c, the number of which is as large as the number of the band pass filters 10, are formed in the grooves 20a of the transparent block 20 and shown by dotted lines.

Figure 24:
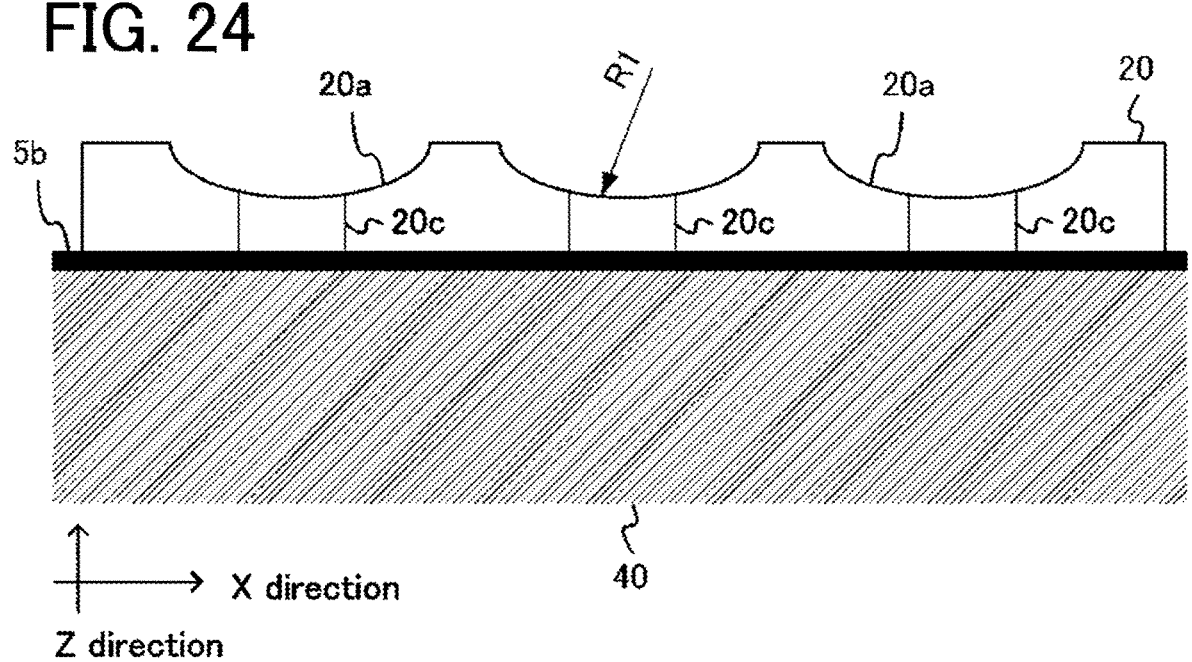
FIG. 24 is a diagram for explaining the relationship between a parallel block holder and a transparent block, in accordance with Embodiment 6 of the present invention.

FIG. 24 shows a structure between the parallel block holder 40 and the transparent block 20, in accordance with the present embodiment of this invention. In the transparent block 20 which is fixed with the parallel block holder 40, hollows 20a of concave shape, the number of which is as large as the number of the band pass filters, are provided on the joining surface with the band pass filters 10. The hollow 20a of the transparent block 20 has a curvature radius R1. Each of the band pass filters 10a to 10c is fixed with an adhesive agent to a hollow 20a of concave shape which has a through hole 20c.

The joining surface front end of a component to be joined (each of the band pass filters 10a to 10c) has a curvature radius R. The curvature radius R1 of the hollow 20a which has concave shape is larger than the curvature radius R of a component to be joined (each of the band pass filters 10a to 10c). The hollow 20a having a through hole 20c, which is processed in the transparent block 20, can be formed by a processing method, such as press processing, drill processing, and etching processing.

Figure 25:
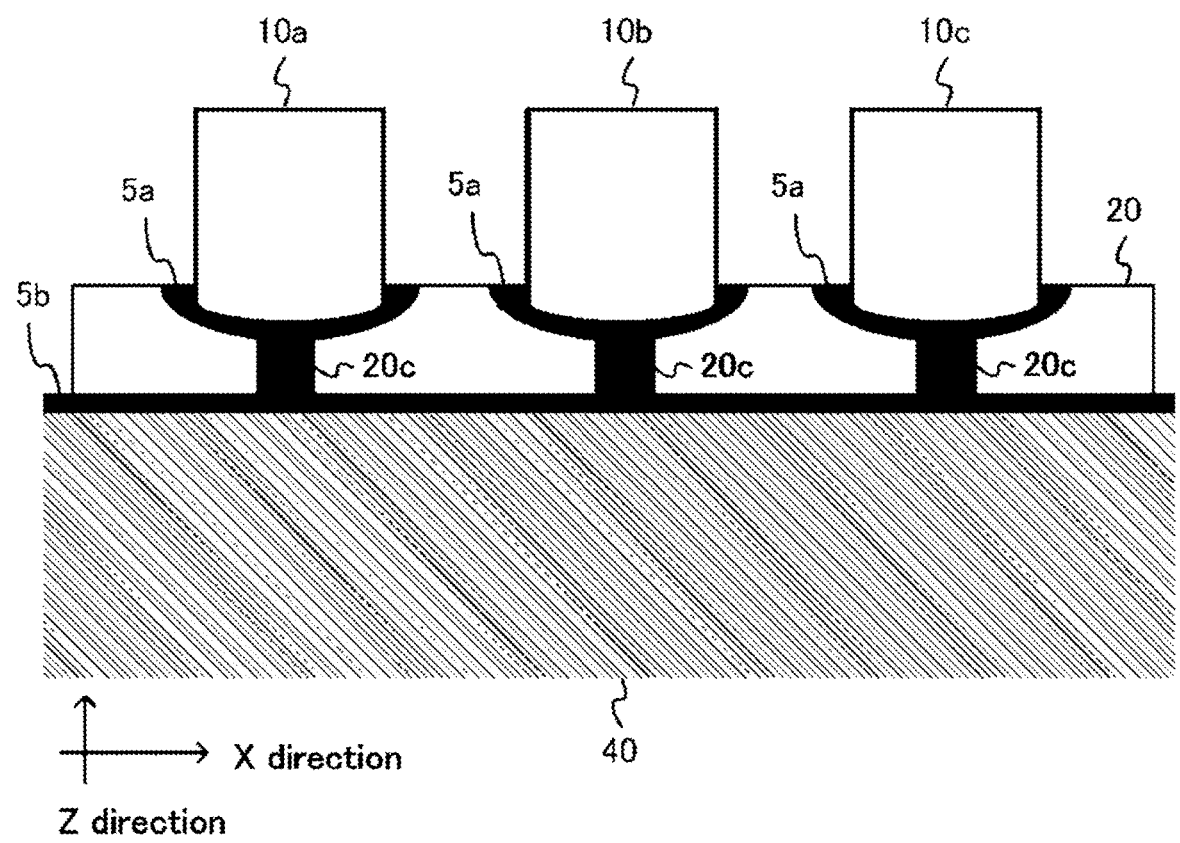
FIG. 25 is a diagram for explaining the bonding structure between a transparent block and band pass filters, in accordance with Embodiment 6 of the present invention.

FIG. 25 shows a bonding structure between the band pass filters 10 and the transparent block 20, in accordance with the present embodiment of this invention. In the case where an optical component (a band pass filter) with a warp is disposed on a flat surface of a transparent block 20, the contact state between the transparent block 20 and the above mentioned optical component becomes point contact. In the present bonding structure, the transparent block 20 is provided with a hollow 20a of concave shape which has a through hole 20c. The joining surface front ends of the band pass filters 10a to 10c have each a curvature radius R. The curvature radius R1 of the hollow 20a is larger than each curvature radius R of the band pass filters 10a to 10c.

In the present bonding structure, since the front end of a component to be joined can follow the shape of the above mentioned hollow 20a, a bonded part is in the state of surface contact, which has a larger frictional resistance, compared with point contact. According to the present bonding structure, since an optical component can have a stabilized posture shortly after the optical component is disposed on a flat surface of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

Further, just as explained in the present structure, in the case where a through hole is provided in the hollow of a plate material (a transparent block 20 and a transparent block 50), joining material (adhesive agent) flows into the through hole, after an optical component is disposed. Flowing out of the joining material (the adhesive agent) into an adjacent component can be reduced, and the mismatch in the attachment position (angle), which is caused by the interference of the joining material (the adhesive agent) with the adjacent component, can be effectively prevented.

In the present bonding structure, like in the former embodiment, the optical mux and demux module includes a single plate material (a transparent block) provided with a hollow of concave shape, which has a curvature radius larger than the curvature radius R of the joining surface front end of a component to be joined. Since the optical component can have a stabilized posture shortly after the optical component is disposed, the variation in the attachment position (angle) can be suppressed. Further, in the case where the position of the gravity center of an optical component and the center of a hollow are in agreement, the mismatch (variation) in the attachment position (angle) can be suppressed to a minimum.

According to an optical mux and demux module in accordance with the present embodiment of this invention, like in the former embodiment, surface contact can be attained as the contact state between a transparent block and a component to be joined (a band pass filter and a mirror). Under these circumstances, the optical mux and demux module becomes less subject to the influence of a position (angle) mismatch, and the accuracy in the attachment position (angle) can be improved. Further, the optical mux and demux module is configured so that an optical component is joined with a single or multiple plate materials (transparent blocks), prior to assembling the optical component (the band pass filter and the mirror) to the main body (the parallel block holder and the transparent block) of the optical mux and demux module. The optical mux and demux module in accordance with present embodiment can attain a lower cost and an enhanced yield, since it becomes possible to sort out exclusively an optical component which satisfies the mismatch in the attachment position (angle).

Embodiment 7

In an optical mux and demux module in accordance with the present embodiment of this invention, a transparent block is bonded with the main body (the parallel block holder) of the optical mux and demux module. In the transparent block, a groove of concave shape is provided at a joining surface, where the joining surface is formed between an optical component (a band pass filter and a mirror), which is a component to be joined, and a joining material (a transparent block). The groove is allowed to be provided with a through hole.

The optical mux and demux module 100 in accordance with the present embodiment of this invention is composed of a band pass filter 10a, a band pass filter 10b, a band pass filter 10c, a transparent block 20, a parallel block holder 40, a transparent block 50, and a mirror 30 (refer to FIG. 9 and FIG. 16). The optical mux and demux module 100 has a function to multiplex a plurality of optical signals L, which are emitted from the laser light sources 2a to 2c and have each a different center wavelength ($\lambda$).

One or more optical signals L impinge on each of the band pass filters 10a to 10c. The mirror 30 as well as the band pass filters 10a to 10c is fixed with the parallel block holder 40. The mirror 30 reflects an optical signal L which is propagated through the parallel block holder 40. The front shape of the parallel block holder 40 is a parallelogram in the embodiment of the present invention. The front shape of the parallel block holder 40 can be other shapes, such as a rectangle.

Figure 26:
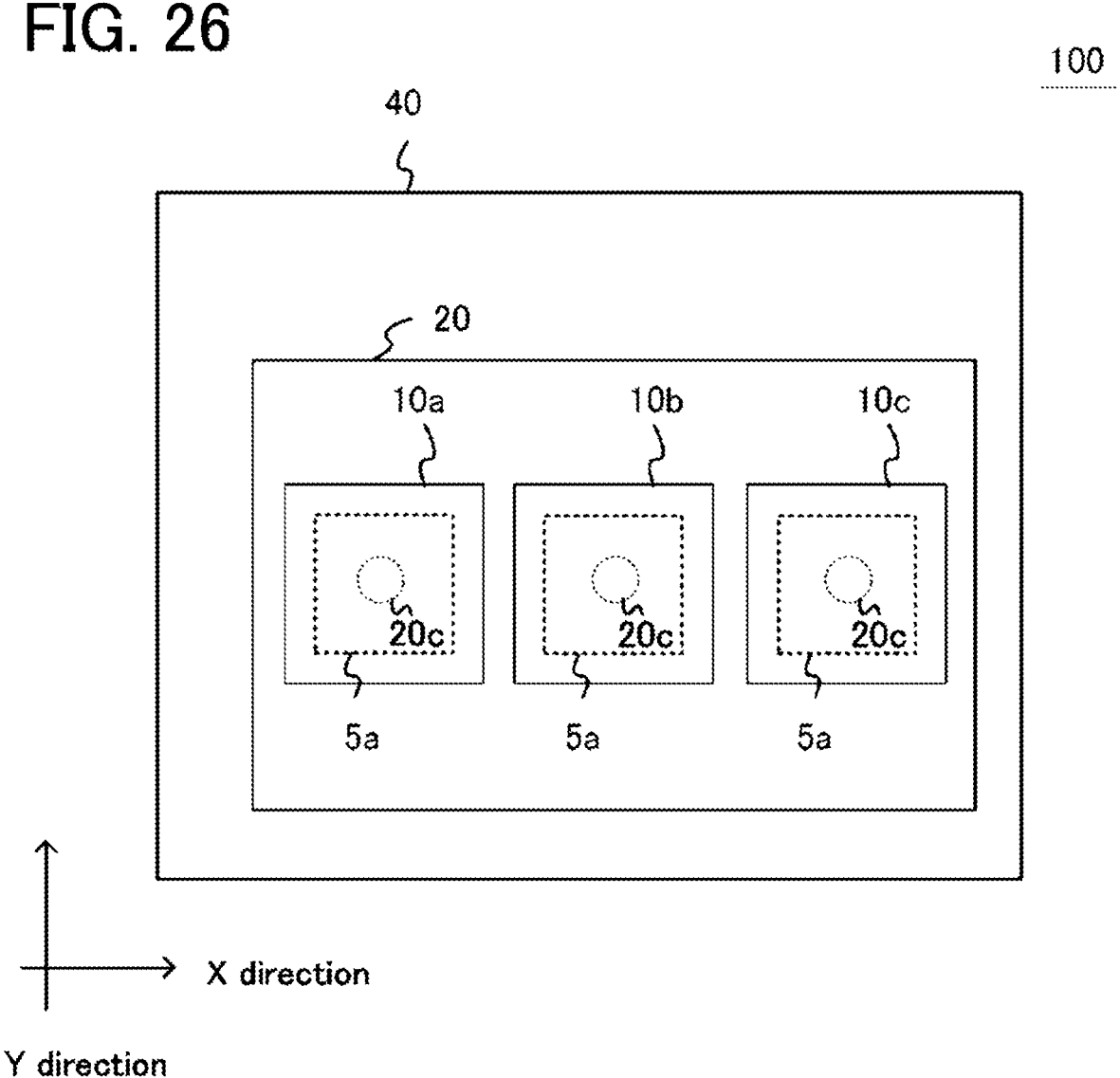
FIG. 26 is a top view for explaining the structure of a transparent block in accordance with Embodiment 7 of the present invention.

FIG. 26 is a top view which shows the structure of an optical mux and demux module in accordance with the present embodiment of this invention. The parallel block holder 40 is made out of glass or transparent resin. The transparent block 20 is fixed on the second principal surface (the second flat surface 41) of the parallel block holder 40 through the adhesive agent 5b. Each of the band pass filters 10a to 10c is fixed on the upper surface (the filter fixing surface 20e) of the transparent block 20 through an adhesive agent 5a. The transparent block 50 (the mirror 30) is fixed on the lower surface of the parallel block holder 40 with an adhesive agent. In the transparent block 20, a groove 20b of concave shape which has a through hole 20c is formed at the joining surface with a band pass filter 10.

Figure 27:
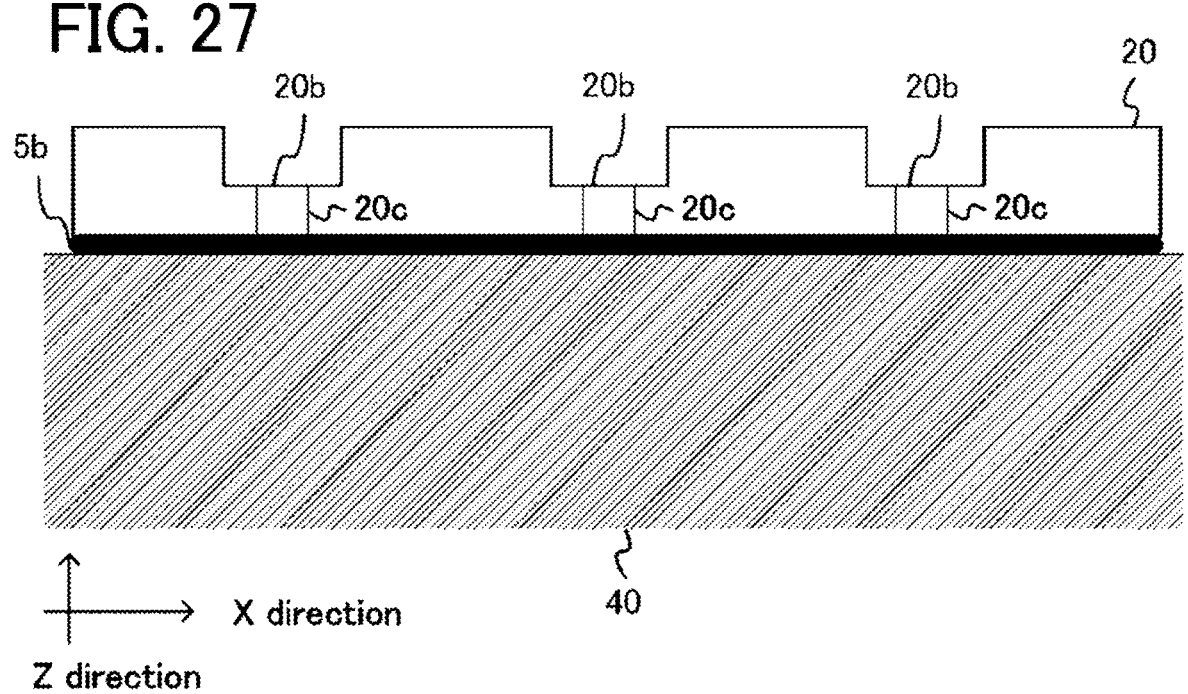
FIG. 27 is a diagram for explaining the relationship between a parallel block holder and a transparent block, in accordance with Embodiment 7 of the present invention.

FIG. 27 shows a structure between the parallel block holder 40 and the transparent block 20, in accordance with the present embodiment of this invention. In the transparent block 20 which is fixed with the parallel block holder 40, grooves 20b of concave shape, the number of which is as large as the number of the band pass filters, are provided on the joining surface with the band pass filters 10. Each of the band pass filters 10a to 10c is fixed to a groove 20b of the transparent block 20 with an adhesive agent. The groove 20b having a through hole 20c, which is processed in the transparent block 20, can be formed by a processing method, such as press processing, drill processing, and etching processing.

Figure 28:
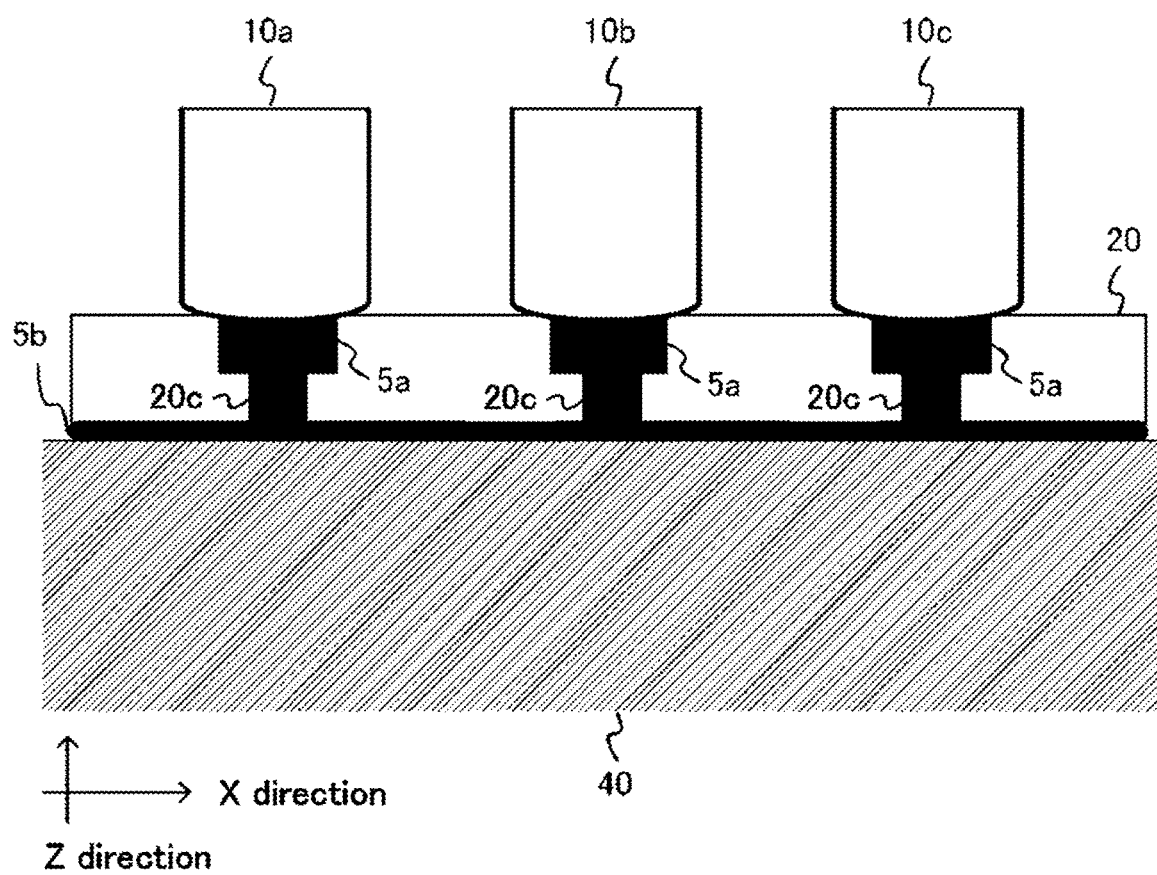
FIG. 28 is a diagram for explaining the bonding structure between a transparent block and band pass filters, in accordance with Embodiment 7 of the present invention.

FIG. 28 shows a bonding structure between the band pass filters 10 and the transparent block 20, in accordance with the present embodiment of this invention. In the case where an optical component (a band pass filter) with a warp is disposed on a flat surface (a filter fixing surface 20e) of a transparent block 20, the contact state between the transparent block 20 and the above mentioned optical component becomes point contact. In the present bonding structure, the transparent block 20 is provided with grooves 20b of concave shape which each have a through hole 20c.

In the present bonding structure, since the front end of a component to be joined can follow the shape of the groove 20b, a bonded part is in the state of surface contact, which has a larger frictional resistance, compared with point contact. According to the present bonding structure, since an optical component can have a stabilized posture shortly after the optical component is disposed on a flat surface of the transparent block 20, the variation in the attachment position (angle) can be suppressed. Further, in the case where the position of the gravity center of an optical component and the center of a hollow are in agreement, the mismatch (variation) in the attachment position (angle) can be suppressed to a minimum.

Further, just as explained in the present structure, in the case where a plate material (a transparent block 20 and a transparent block 50) is provided with a through hole, joining material (adhesive agent) flows into the through hole, after an optical component is disposed. Under these circumstances, flowing out of the joining material (the adhesive agent) into an adjacent component can be reduced, and the mismatch in the attachment position (angle), which is caused by the interference of the joining material (the adhesive agent) with the adjacent component, can be effectively prevented.

In the present bonding structure, like in the former embodiment, the optical mux and demux module includes a single or a plurality of plate materials (transparent block elements), which is provided with a groove of concave shape, having a curvature radius larger than the curvature radius R of the joining surface front end of a component to be joined. Since an optical component can have a stabilized posture shortly after the optical component is disposed, the variation in the attachment position (angle) can be suppressed. Further, in the case where the position of the gravity center of an optical component and the center of a hollow are in agreement, the mismatch (variation) in the attachment position (angle) can be suppressed to a minimum.

According to an optical mux and demux module in accordance with the present embodiment of this invention, like in the former embodiment, surface contact can be attained as the contact state between a transparent block and a component to be joined (a band pass filter and a mirror). Under these circumstances, the optical mux and demux module becomes less subject to the influence of a position (angle) mismatch, and the accuracy in the attachment position (angle) can be improved. Further, the optical mux and demux module is configured so that an optical component is joined with a single or multiple plate materials (transparent block elements), prior to assembling the optical component (the band pass filter and the mirror) to the main body (the glass block) of the optical mux and demux module. The optical mux and demux module in accordance with the present embodiment can attain a lower cost and an enhanced yield, since it becomes possible to sort out exclusively an optical component which satisfies the mismatch in the attachment position (angle).

Note that, in the present invention, each of the embodiments can be freely combined, appropriately modified and/or eliminated without departing from the scope of the invention.

EXPLANATION OF NUMERALS AND SYMBOLS

2a Laser light source, 2b Laser light source, 2c Laser light source, 5a Adhesive agent, 5b Adhesive agent, 5c Adhesive agent, 5d Adhesive agent, 10 Band pass filter, 10a Band pass filter, 10b Band pass filter, 10c Band pass filter, 11 Base plate, 11a First principal surface, 11b Second principal surface, 12 Band pass filter film, 13 Antireflection film, 20 Transparent block, 20b Groove, 20c Through hole, 20e Filter fixing surface, 20f Block holder fixing surface, 20g Base surface, 20x Transparent block element, 20y Transparent block element, 20z Transparent block element, 30 Mirror, 31 Mirror main body, 32 Reflection film, 40 Parallel block holder, 41 Second flat surface, 42 First flat surface, 50 Transparent block, 50e Mirror fixing surface, R Curvature radius, R1 Curvature radius, R2 Curvature radius, R3 Curvature radius, L Optical signal, P Optical axis, 100 Optical mux and demux module

The invention claimed is:

1. An optical mux and demux module, comprising:
   a mirror which has a reflective surface,
   a parallel block holder which has a first principal surface and a second principal surface arranged in parallel, where the mirror is disposed at a first principal surface side, and
   a plurality of band pass filters each of which has a fixing side principal surface and an incident side principal surface, where the parallel block holder is fixed on the fixing side principal surface,
wherein dug portions, being the same in number with the band pass filters, are formed on the second principal surface which the parallel block holder has, and
   the plurality of band pass filters are fixed with the parallel block holder with an adhesive agent which is thrown into the dug portions.

2. The optical mux and demux module according to claim 1,
   wherein the fixing side principal surface which a band pass filter has, has a curvature radius R,
      the dug portion, which is formed on the second principal surface which the parallel block holder has, has a curvature radius R1, and
      the curvature radius R1 of the dug portion, which is formed on the second principal surface which the parallel block holder has, is larger than the curvature radius R of the fixing side surface which the band pass filter has.

3. The optical mux and demux module according to claim 1,
   wherein the dug portion, which is formed on the second principal surface which the parallel block holder has, includes a base surface which is made flat.

4. The optical mux and demux module according to claim 1,
   wherein a dug portion is formed on the first principal surface which the parallel block holder has, and the mirror is fixed with the parallel block holder with an adhesive agent which is thrown into the dug portion formed on the first principal surface.

5. An optical mux and demux module, comprising:
a mirror which has a reflective surface,
a parallel block holder which has a first principal surface and a second principal surface arranged in parallel, where the mirror is disposed at a first principal surface side,
a transparent block, which has a filter fixing surface and is disposed at a second principal surface side of the parallel block holder, and
a plurality of band pass filters each of which has a fixing side principal surface and an incident side principal surface, where the transparent block is fixed on the fixing side principal surface,
wherein dug portions, being the same in number with the band pass filters, are formed on the filter fixing surface which the transparent block has, and
the band pass filters are fixed with the transparent block with an adhesive agent which is thrown into the dug portion.

6. The optical mux and demux module according to claim 5,
wherein the fixing side principal surface, which the band pass filter has, has a curvature radius R,
the dug portion, which is formed on the filter fixing surface which the transparent block has, has a curvature radius R1, and
the curvature radius R1 of the dug portion, which is formed on the filter fixing surface which the transparent block has, is larger than the curvature radius R of the fixing side principal surface which the band pass filter has.

7. The optical mux and demux module according to claim 5,
wherein the dug portion, which is formed on the filter fixing surface which the transparent block has, includes a base surface which is made flat.

8. The optical mux and demux module according to claim 5,
wherein a through hole is formed in the dug portion which is formed on the filter fixing surface which the transparent block has.

9. The optical mux and demux module according to claim 5,
wherein the transparent block is composed of a plurality of transparent block elements, and
the number of the plurality of transparent block elements is the same with the number of the plurality of band pass filters.

10. The optical mux and demux module according to claim 5,
further comprising a transparent block which is disposed between the parallel block holder and the mirror.

* * * * *